(12) United States Patent
Yoda et al.

(10) Patent No.: US 10,196,082 B2
(45) Date of Patent: Feb. 5, 2019

(54) POWER STEERING APPARATUS

(71) Applicant: HITACHI AUTOMOTIVE SYSTEMS, LTD., Hitachinaka-shi, Ibaraki (JP)

(72) Inventors: Toshiro Yoda, Higashimatsuyama (JP); Takuya Ishihara, Kumagaya (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 146 days.

(21) Appl. No.: 15/116,403

(22) PCT Filed: Jan. 27, 2015

(86) PCT No.: PCT/JP2015/052134
§ 371 (c)(1),
(2) Date: Aug. 3, 2016

(87) PCT Pub. No.: WO2015/118991
PCT Pub. Date: Aug. 13, 2015

(65) Prior Publication Data
US 2016/0347352 A1 Dec. 1, 2016

(30) Foreign Application Priority Data

Feb. 4, 2014 (JP) ................................. 2014-019084

(51) Int. Cl.
| | |
|---|---|
| *B62D 5/04* | (2006.01) |
| *B62D 5/09* | (2006.01) |
| *B62D 5/24* | (2006.01) |
| *B62D 3/14* | (2006.01) |
| *B62D 6/00* | (2006.01) |

(52) U.S. Cl.
CPC ............. *B62D 5/0403* (2013.01); *B62D 3/14* (2013.01); *B62D 5/0442* (2013.01); *B62D 5/0457* (2013.01); *B62D 5/09* (2013.01); *B62D 5/24* (2013.01); *B62D 6/002* (2013.01)

(58) Field of Classification Search
CPC ... B62D 3/14; B62D 5/09; B62D 5/24; B62D 5/0457; B62D 6/002
USPC ......................................................... 180/422
See application file for complete search history.

(56) References Cited

U.S. PATENT DOCUMENTS

| 2006/0108884 A1* | 5/2006 | Shiino .................... B60T 8/267 310/89 |
| 2015/0298728 A1* | 10/2015 | Yoda ........................ H02K 7/06 180/422 |

FOREIGN PATENT DOCUMENTS

| EP | 0154388 A | 9/1985 |
| JP | 01-502578 A | 9/1989 |
| JP | 2005-096767 A | 4/2005 |
| JP | 2005-306317 A | 11/2005 |
| JP | 2010-253992 A | 11/2010 |
| JP | 2015-013548 A | 1/2015 |

* cited by examiner

*Primary Examiner* — Kevin Hurley
*Assistant Examiner* — Felicia L. Brittman
(74) *Attorney, Agent, or Firm* — Foley & Lardner LLP

(57) ABSTRACT

The present invention provides a power steering apparatus capable of realizing a reduction in an axial dimension of the apparatus. A resolver 16, which detects a rotational position of a motor rotor 13, is provided between a motor element 15 and a steering housing 6 in a direction of an x axis. A bolt 19, which fixes a motor housing 17 to the steering housing 6, is provided so as to overlap the resolver 16 in the direction of the x axis radially outside the resolver 16.

21 Claims, 14 Drawing Sheets

POWER STEERING APPARATUS

TECHNICAL FIELD

The present invention relates to a power steering apparatus.

BACKGROUND ART

PTL 1 discloses a technique that rotates a control valve for switching a hydraulic supply source of a hydraulic power steering apparatus with use of an electric motor.

CITATION LIST

Patent Literature

PTL 1: Japanese Patent Application Public Disclosure No. 2005-96767

SUMMARY OF INVENTION

Technical Problem

The above-described conventional technique is subject to a need for a further reduction in an axial dimension of the apparatus.

An object of the present invention is to provide a power steering apparatus that can realize the reduction in the axial dimension of the apparatus.

Solution to Problem

In a power steering apparatus according to one aspect of the present invention, a rotational sensor configured to detect a rotational position of a motor rotor is provided between a motor element and a steering housing in an axial direction, and a fixation member fixing a motor housing to the steering housing is provided so as to overlap the rotational sensor in the axial direction radially outside the rotational sensor.

Advantageous Effect of Invention

Therefore, the present invention can realize the reduction in the axial dimension of the apparatus.

DESCRIPTION OF EMBODIMENTS

First Embodiment

First, a configuration will be described.

Figure 1:
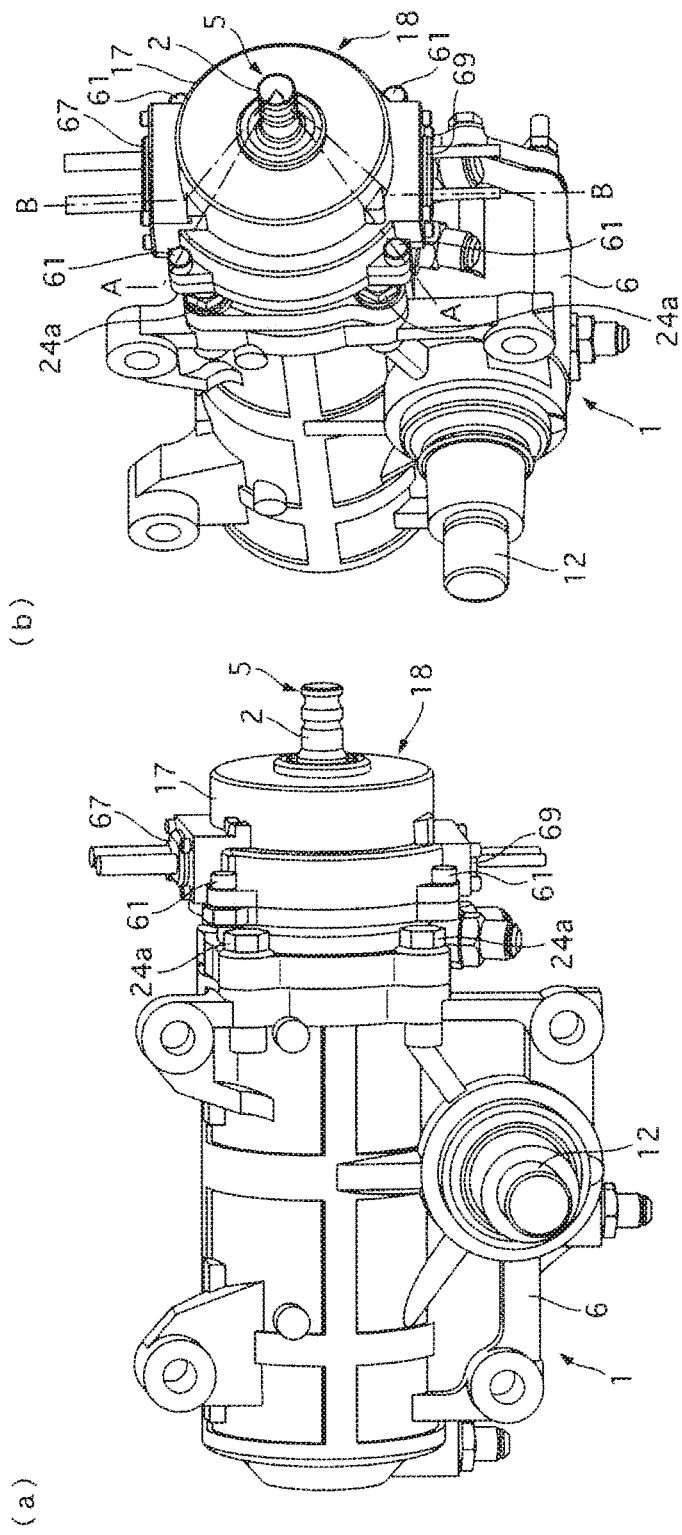
FIGS. 1(a) and 1(b) are a perspective view of a side surface side and a perspective view of a front side of an apparatus 1 according to a first embodiment, respectively.
Figure 2:
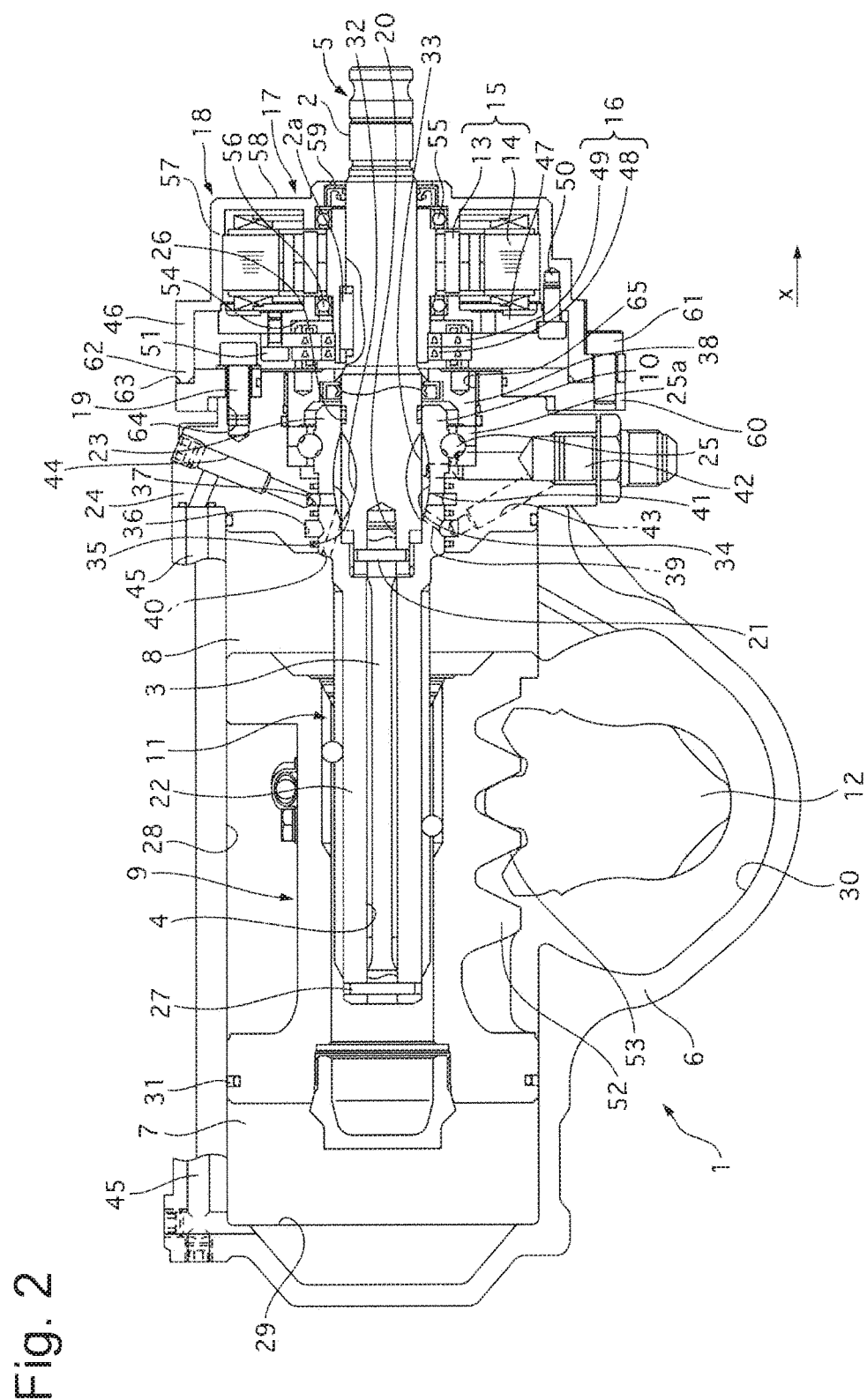
FIG. 2 is a combination of a vertical cross-sectional view of a steering housing 6 and a cross-sectional view of a motor housing 17 taken along a line A-A according to the first embodiment.
Figure 3:
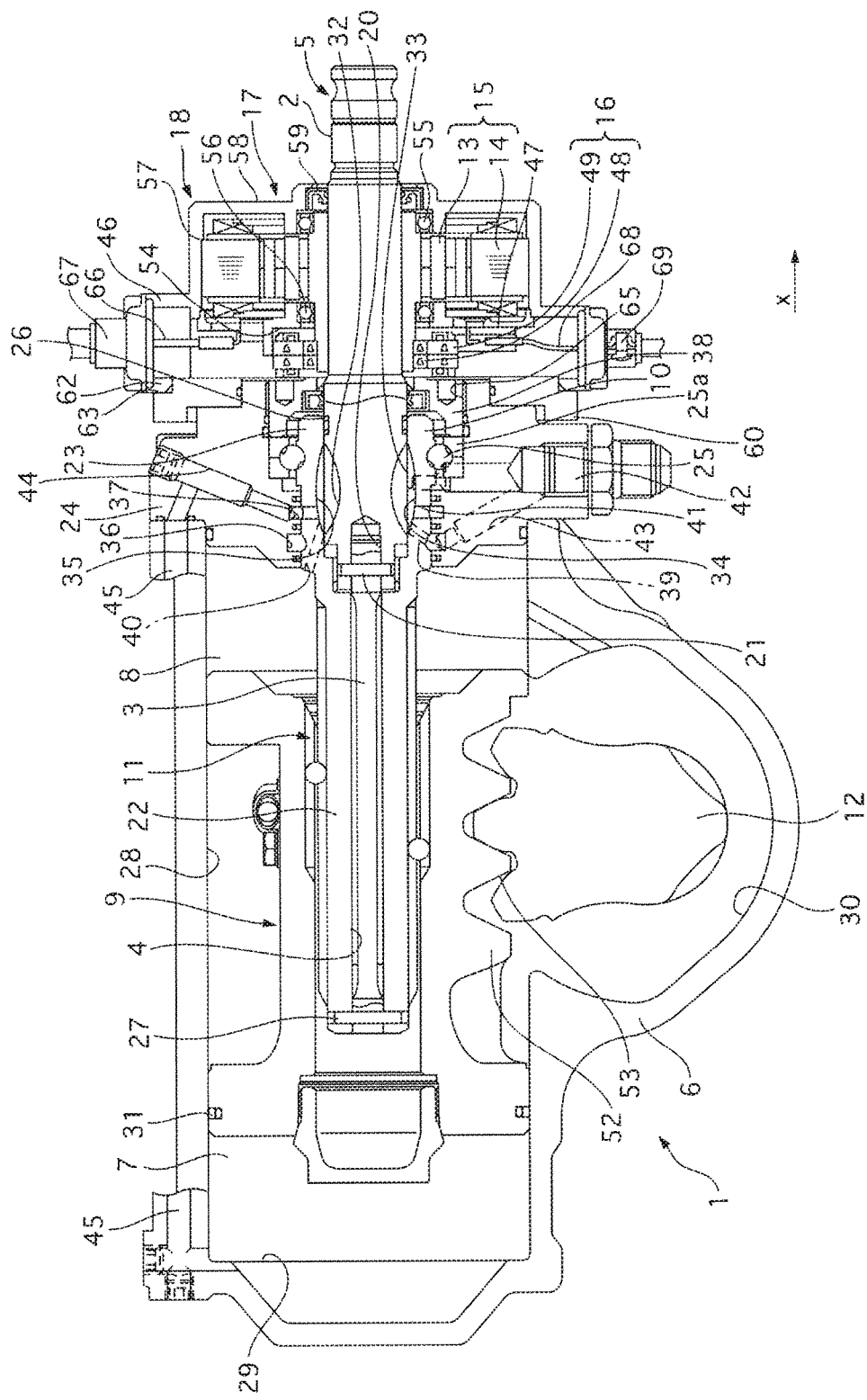
FIG. 3 is a combination of the vertical cross-sectional view of the steering housing 6 and a cross-sectional view of the motor housing 17 taken along a line B-B according to the first embodiment.
Figure 4:
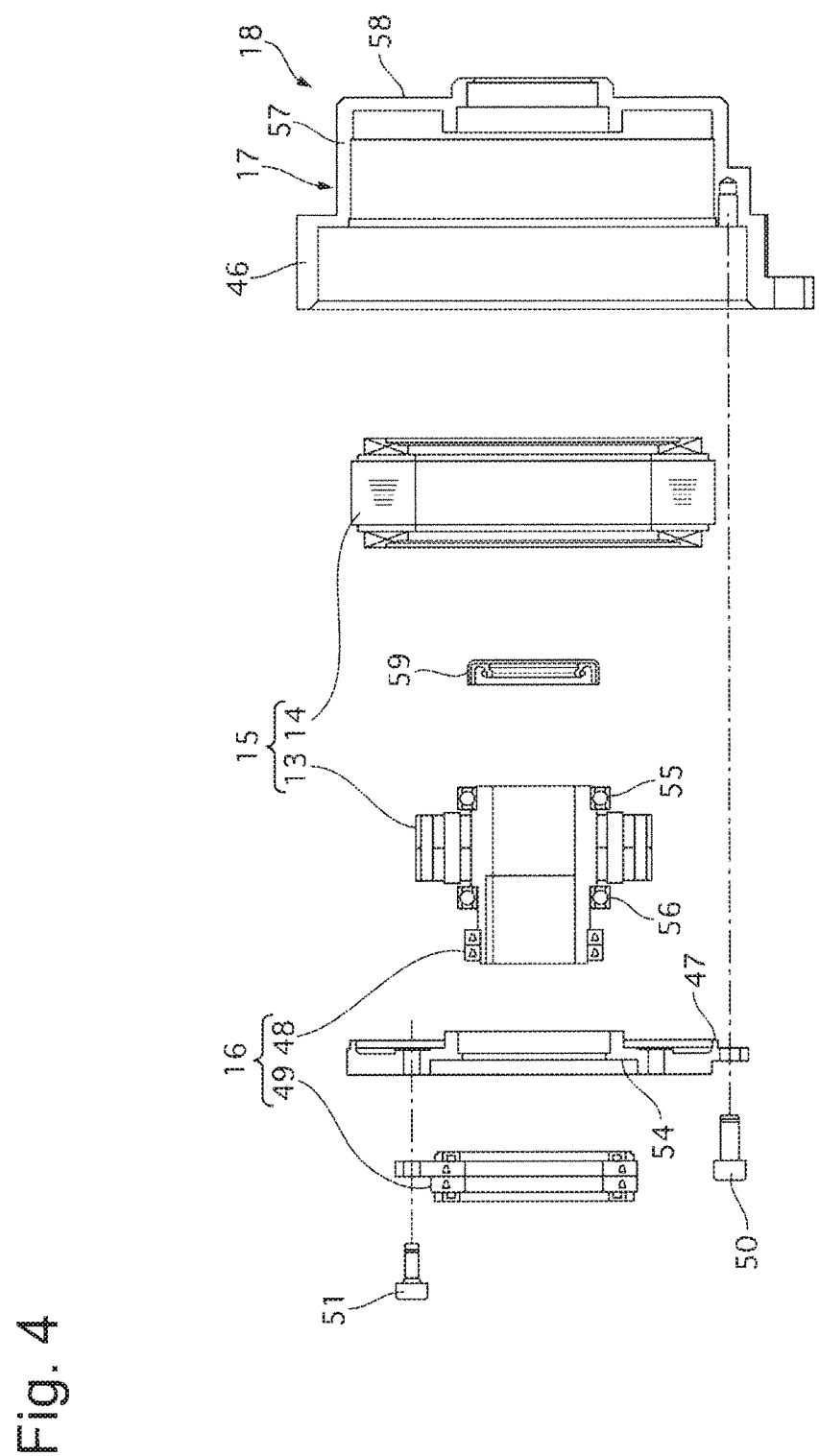
FIG. 4 is an exploded side view of a brushless motor 18 according to the first embodiment.
Figure 5:
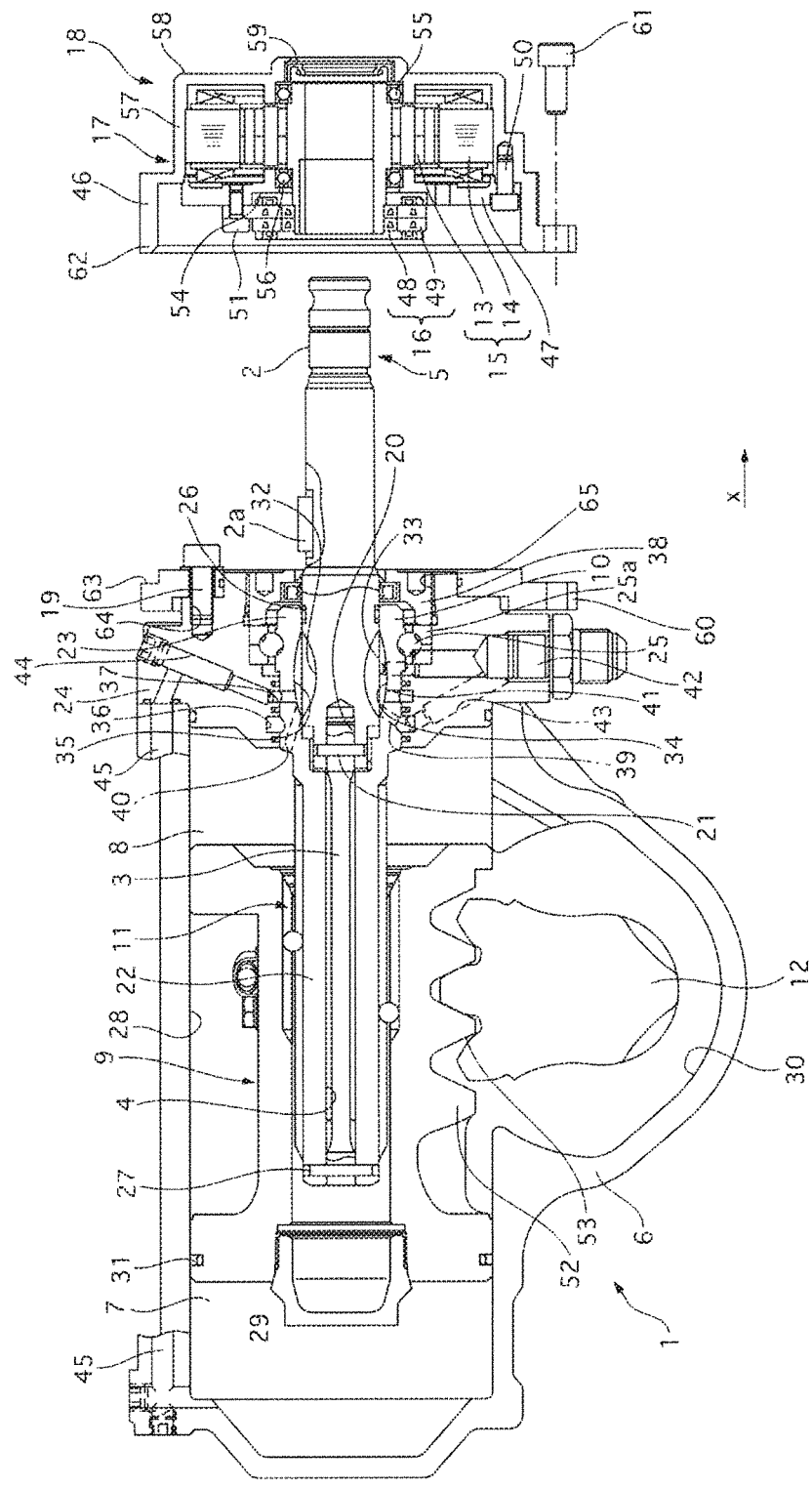
FIG. 5 is a side view illustrating the steering housing 6 and the brushless motor 18 separated from each other according to the first embodiment.

FIGS. 1(a) and 1(b) are a perspective view of a side surface side and a perspective view of a front side of an integral power steering apparatus (hereinafter referred to as an apparatus) 1 according to a first embodiment, respectively. FIG. 2 is a combination of a vertical cross-sectional view of a steering housing 6 and a cross-sectional view of a motor housing 17 taken along a line A-A. FIG. 3 is a combination of the vertical cross-sectional view of the steering housing 6 and a cross-sectional view of the motor housing 17 taken along a line B-B. FIG. 4 is an exploded side view of a brushless motor 18. FIG. 5 is a side view illustrating the steering housing 6 and the brushless motor 18 separated from each other. The apparatus 1 is mounted on a vehicle, and is used to assist or automate steering. Hereinafter, an x axis is set to a direction in which an input shaft 2 extends, and a positive direction is assumed to be a direction toward a steering wheel (a right side in FIG. 2).

The apparatus 1 includes a steering shaft 5, a steering housing 6, a piston 9, a control valve 10, a conversion mechanism (a ball nut 11), and a transmission mechanism (a sector gear 12). The steering shaft 5 includes an input shaft 2 and a torsion bar containing portion 4 (an output shaft). The input shaft 2 rotates according to an operation of steering the steering wheel. The torsion bar containing portion 4 is connected to the input shaft 2 via a torsion bar 3. The steering housing 6 rotatably supports the steering shaft 5. The piston 9 is provided in the steering housing 6, and divides an inside of the steering housing 6 into a first pressure chamber 7 and a second pressure chamber 8. The control valve 10 is provided in the steering housing 6, and selectively supplies hydraulic fluid supplied from a pump due to a relative rotation between the input shaft 2 and the torsion bar containing portion 4 into the first pressure chamber 7 and the second pressure chamber 8. The conversion mechanism converts a rotation of the torsion bar containing portion 4 into a displacement of the piston 9 in the direction of the x axis. The transmission mechanism transmits the displacement of the piston 9 in the direction of the x axis to a steering wheel.

Further, the apparatus 1 includes a motor element 15 and a hollow brushless motor 18. The brushless motor 18 includes a resolver (a rotational sensor) 16, and a motor housing 17. The motor element 15 includes a motor rotor 13 provided around an outer periphery of the input shaft 2 and configured to rotate together with the input shaft 2, and a motor stator 14 provided around an outer periphery of the motor rotor 13. The resolver 16 is provided between the motor element 15 and the steering housing 6 in the direction of the x axis, and detects a rotational position of the motor rotor 13. The motor housing 17 contains the motor element 15 and the resolver 16 therein. The brushless motor 18 controls a rotation of the input shaft 2 according to an operation status of the vehicle.

The input shaft 2 and the motor rotor 13 are fixed to each other by a key 2*a*, and rotate together with each other. A hollow portion 20 is formed at an end of the input shaft 2 on a negative side located in a negative direction of the x axis, and an end of the torsion bar 3 on a positive side located in the positive direction of the x axis is inserted in this hollow portion 20. The input shaft 2 and the torsion bar 3 are fixed to each other by a pin 21, and rotate together with each other. A screw shaft 22 is connected to the input shaft 2 via the torsion bar 3. A valve body 23 is formed integrally with the screw shaft 22 on a positive side of the screw shaft 22 that is located in the positive direction of the x axis. The valve body 23 is rotatably supported by a valve housing 24 via a ball bearing 25. The valve housing 24 is integrally coupled to the steering housing 6 by a bolt 24*a* to an end of the steering housing 6 on the positive side located in the positive direction of the x axis. The hollow torsion bar containing portion 4 is formed in the screw shaft 22, and the torsion bar 3 is contained in the torsion bar containing portion 4. An outer periphery of the end of the input shaft 2 on the negative side located in the negative direction of the x axis is inserted in an inner periphery of an end of the torsion bar containing portion 4 on the positive side located in the positive direction of the x axis. The input shaft 2 is supported rotatably relative to the screw shaft 22 via a bearing 26. An end of the torsion bar 3 on the negative side located in the negative direction of the x axis is fixed to an end of the screw shaft 22 on the negative side located in the negative direction of the x axis by a pin 27. The valve housing 24 includes a lock nut containing hole 65 on the positive side located in the positive direction of the x axis. The lock nut containing hole 65 is opened to a female screw portion 64 in which a bolt 19 is screwed. The ball bearing 25 is inserted at an end of the lock nut containing hole 65 on the negative side located in the negative direction of the x axis, and a lock nut 38 is provided at an end of the lock nut containing hole 65 on the positive side located in the positive direction of the x axis. The lock nut 38 limits a displacement of an outer race 25*a* of the ball bearing 25 in the positive direction of the x axis. The female screw portion 64 is provided so as to overlap the lock nut 38 in the direction of the x axis.

The piston 9 is provided on the screw shaft 22 so as to be displaceable in the direction of the x axis via the ball nut 11. The piston 9 is contained in a cylindrical cylinder portion 28 formed inside the steering housing 6. An end of the cylinder portion 28 on the positive side located in the positive direction of the x axis is closed by the valve housing 24, and an end of the cylinder portion 28 on the negative side located in the negative direction of the x axis is closed by a bottom 29. The sector gear 12 is contained in a gear chamber 30 formed in the steering housing 6 in a direction perpendicular to the cylinder portion 28. The sector gear 12 is meshed with rack teeth 53 of a rack 52 formed on an outer periphery of the piston 9. A pitman arm is connected to the sector gear 12. A piston seal 31 is mounted around the outer periphery of the piston 9. The piston seal 31 divides the cylinder portion 28 into the first pressure chamber 7 and the second pressure chamber 8, thereby forming a power cylinder. The negative side located in the negative direction of the x axis with respect to the piston seal 31 of the cylinder portion 28 serves as the first pressure chamber 7, and the positive side located in the positive direction of the x axis with respect to the piston seal 31 of the cylinder portion 28 and the gear chamber 30 serves as the second pressure chamber 8.

A plurality of switching grooves 32 extending in the direction of the x axis is provided on the outer periphery of the input shaft 2 at predetermined intervals. A plurality of first axial grooves 34 and a plurality of second axial grooves 35 extending in the direction of the x axis are formed at predetermined intervals on an inner periphery of a rotor containing portion 33 of the valve body 23 that faces the outer periphery of the input shaft 2. An intake side circumferential groove 36 and a first pressure chamber side circumferential groove 37 extending in a circumferential direction are formed on an inner peripheral surface of the valve housing 24 that faces an outer periphery of the valve body 23 so as to be spaced apart from each other in the direction of the x axis.

A first hydraulic passage 39, a second hydraulic passage 40, and a third hydraulic passage 41 are formed at the valve body 23. The first hydraulic passage 39 establishes communication between the first axial groove 34 and the first pressure chamber side circumferential groove 37. The second hydraulic passage 40 establishes communication between the second axial groove 35 and the second pressure chamber 8. The third hydraulic passage 41 establishes communication between the inner periphery and the outer periphery of the valve body 23. An intake port 42, a fourth hydraulic passage 43, and a fifth hydraulic passage 44 are formed at the valve housing 24. The intake port 42 is connected to an external oil pump. The fourth hydraulic passage 43 establishes communication between the intake port 42 and the intake side circumferential groove 36. The fifth hydraulic passage 44 is connected to the first pressure chamber side circumferential groove 37. A sixth hydraulic passage 45 is formed at the steering housing 6. The sixth hydraulic passage 45 establishes communication between the fifth hydraulic passage 44 and the first pressure chamber 7. The switching grooves 32 of the input shaft 2, the first axial grooves 24 and the second axial grooves 35 of the valve body 23 form a control valve 10, which switches a destination to which the hydraulic fluid is supplied from the oil pump between the first pressure chamber 7 and the second pressure chamber 8 according to a relative rotation between the input shaft 2 and the valve body 23.

The motor housing 17 includes a main body portion 46 and an inner housing 47. The main body portion 46 surrounds an outer periphery of the motor element 15. The inner housing 47 is provided between the motor element 15 and the steering housing 6 in the direction of the x axis, and is fixed to an inner side of the main body portion 46. The main body portion 46 includes a cylindrical portion 57, a cover portion 58, and an adapter member 60. The cylindrical portion 57 surrounds the outer peripheral side of the motor element 15. The cover portion 58 is molded integrally with the cylindrical portion 57, and closes a positive side of the cylindrical portion 57 that is located in the positive direction of the x axis. The adapter member 60 is provided on a negative side of the cylindrical portion 57 that is located in the negative direction of the x axis. The cylindrical portion 57 and the adapter member 60 are fixed to each other by a bolt 61. A fitting target portion 63 is provided on a positive side of the adapter member 60 that is located in the positive direction of the x axis. A fitting portion 62 on the negative side of the cylindrical portion 57 that is located in the negative direction of the x axis is fitted to the fitting target portion 63. The fitting portion 62 is fitted so as to overlap the adapter member 60 in the direction of the x axis radially outside the adapter member 60.

A seal member 59 is provided at the cover portion 58. The seal member 59 seals between the motor housing 17 and the input shaft 2. The adapter member 60 of the motor housing 17 is fixed to the steering housing 6 by a bolt (a fixation member) 19. The bolt 19 is provided radially outside the resolver 16 and is provided between the motor element 15 and the steering housing 6 so as to overlap the resolver 16 in the direction of the x axis. The motor housing 17 is fixed to the steering housing 6 with the resolver 16 exposed to the outside on a negative side thereof that is located in the negative direction of the x axis.

The inner housing 47 is fixed to the motor housing 17 by a bolt 50. A recessed portion 54 is provided on a negative side of the inner housing 47 that is located in the negative direction of the x axis. The recessed portion 54 is opened on a side that faces the resolver 16 in the direction of the x axis. A sensor stator 49 of the resolver 16 is disposed so as to enter the recessed portion 54 from the negative side located in the negative direction of the x axis. Two ball bearings 55 and 56 are provided at the inner housing 47. The ball bearings 55 and 56 rotatably support the motor rotor 13. The ball bearing (an upper bearing) 55 rotatably supports an end of the motor rotor 13 on the positive side located in the positive direction of the x axis, and is provided at the cover portion 58 adjacent to a negative side of the seal member 59 that is located in the negative direction of the x axis. The ball bearing (a lower bearing) 56 rotatably supports an end of the motor rotor 13 that is located in the negative direction of the x axis, and is disposed between the motor element 15 and the resolver 16 in the direction of the x axis.

The resolver 16 includes a sensor rotor 48 and the sensor stator 49. The sensor rotor 48 rotates together with the input shaft 2. The sensor stator 49 is provided radially outside the sensor rotor 48, and is fixed to the inner housing 47. The sensor stator 49 is fixed to the inner hosing 47 by a sensor stator fixation bolt 51. The sensor stator fixation bolt 51 is provided so as to overlap the resolver 16 and the bolt 19 in the direction of the x axis. In the first embodiment, the power steering apparatus 1 has a redundant configuration using two resolvers. This configuration allows the power steering apparatus 1 to keep detecting the rotational position of the motor rotor 13 and thus continue controlling the brushless motor 18, even when a failure occurs in one of them.

In the brushless motor 18, the motor stator 14 is a coil winding. Then, a wiring 66, which supplies power to the coil winding, is disposed between the motor element 15 and the steering housing 6 in the direction of the x axis and is disposed radially outside the resolver 16. The wiring 66 is electrically connected to a connector 67 mounted on an outer periphery of the motor housing 17. Similarly, a wiring 68, which supplies power to the resolver 16, is also disposed between the motor element 15 and the steering housing 6 in the direction of the x axis and is disposed radially outside the resolver 16 and at an opposite side from the wiring 66. The wiring 68 is electrically connected to a connector 69 mounted on the outer periphery of the motor housing 17 on an opposite side form the connector 67.

Next, function will be described.

(Function of Assisting and Automating Steering)

When a driver steers the steering wheel in such a manner that the piston 9 is displaced toward the first pressure chamber 7 side (the negative side located in the negative direction of the x axis), the hydraulic fluid is supplied from the control valve 10 into the second pressure chamber 8. More specifically, the hydraulic fluid discharged from the oil pump is supplied into the second pressure chamber 8 after passing through the intake port 42, the fourth hydraulic passage 43, the first axial grooves 34, the third hydraulic passage 41, the switching grooves 32, the second axial grooves 35, and the second hydraulic passage 40. A pressure in the second pressure chamber 8 increases, and this pressure cause an assist force to be applied for displacing the piston 9 toward the first pressure chamber 7 side, thereby allowing the driver to steer the steering wheel with a light force.

On the other hand, when the driver steers the steering wheel in such a manner that the piston 9 is displaced toward the second pressure chamber 8 side (the positive side located in the positive direction of the x axis), the hydraulic fluid is supplied from the control valve 10 into the first pressure chamber 7. More specifically, the hydraulic fluid discharged from the oil pump is supplied into the first pressure chamber 7 after passing through the intake port 42, the fourth hydraulic passage 43, the first axial grooves 34, the third hydraulic passage 41, the switching grooves 32, the first axial grooves 34, the first hydraulic passage 39, the first pressure chamber side circumferential groove 37, the fifth hydraulic passage 4, and the sixth hydraulic passage 45. A pressure in the first pressure chamber 7 increases, and this pressure causes an assist force to be applied for displacing the piston 9 toward the second pressure chamber 8 side, thereby allowing the driver to steer the steering wheel with a light force.

Further, even when the driver does not steer the steering wheel, a stroke of the piston 9 can be generated with the aid of a differential pressure between the first pressure chamber 7 and the second pressure chamber 8 by rotationally driving the brushless motor 18 to control the rotation of the input shaft 2 in such a manner that the piston 9 is displaced toward the first pressure chamber 7 side (the negative side located in the negative direction of the x axis) or the second pressure chamber 8 side (the positive side located in the positive direction of the x axis). In other words, the steering wheel can be steered to a desired turning angle without the driver steering the steering wheel, by rotationally driving the brushless motor 18 according to the operation status of the vehicle. This configuration can realize automatic steering of automatically controlling the steering wheel by rotationally driving the brushless motor 18 according to the operation status of the vehicle, such as a lane keeping assist. The control of the rotation of the input shaft 2 also includes generating a motor torque so as to prohibit the input shaft 2 from rotating.

(Function of Reduction in Axial Dimension)

In the first embodiment, the revolver 16, which detects the rotational position of the motor rotor 13, is provided between the motor element 15 and the steering housing 6 in the direction of the x axis, and the bolt 19, which fixes the motor housing 17 to the steering housing 6, is provided so as to overlap the resolver 16 in the direction of the x axis radially outside the resolver 16. In other words, the bolt 19 is provided so as to overlap the resolver 16 in the direction of the x axis radially outside the resolver 16, that the radial outside being a dead space. Thereby the first embodiment can realize a reduction in an axial dimension of the apparatus 1.

The wiring 66, which supplies power to the motor stator 14 (the coil wiring), is disposed between the motor element 15 and the steering housing 6 in the direction of the x axis radially outside the resolver 16. Therefore, the power supply wiring 66 is disposed radially outside the resolver 16, the radial outside being the dead space. Thereby the first embodiment can realize a further reduction in the axial dimension of the apparatus 1.

The motor housing 17 includes the cylindrical portion 57, which surrounds the outer peripheral side of the motor element 15, and the cover portion 58, which is molded integrally with the cylindrical portion 57 and closes the opposite side of the cylindrical portion 57 from the steering housing 6. In other words, the cylindrical portion 57 and the cover portion 58 of the motor housing 17 are molded integrally with each other, which eliminates the necessity of a bolt or the like for connecting the cylindrical portion 57 and the cover portion 58 to each other. Therefore, the first embodiment can realize a further reduction in the axial dimension of the apparatus 1.

The first embodiment includes the sensor stator fixation bolt 51, which fixes the sensor stator 49 to the inner housing 47. Then, the sensor stator fixation bolt 51 is provided so as to overlap the revolver 16 in the direction of the x axis. Therefore, the sensor stator fixation bolt 51 is arranged so as to overlap the resolver 16 in the direction of the x axis, and thereby first embodiment can prevent or cut down an increase in the axial dimension.

The recessed portion 54, which is opened to the side that faces the resolver 16 in the direction of the x axis, is provided on the inner housing 47, and the resolver 16 is disposed so as to enter the recessed portion 54 in the direction of the x axis. Therefore, the first embodiment can realize a further reduction in the axial dimension of the apparatus 1.

The apparatus 1 includes the sensor stator fixation bolt 51, which fixes the sensor stator 49 to the inner housing 47, and the sensor stator fixation bolt 51 is provided so as to overlap the bolt 19 in the direction of the x axis. Therefore, the sensor stator fixation bolt 51 is provided so as to overlap the bolt 19 in the direction of the x axis, and thereby the first embodiment can prevent or cut down the increase in the axial dimension.

The motor housing 17 includes the seal member 59 and the ball bearing 55. The seal member 59 is provided at the cover portion 58 and seals between the motor housing 17 and the input shaft 2. The ball bearing 55 is provided at the cover portion 58 so as to be located adjacent to the seal member 59 in the direction of the x axis, and rotatably supports the motor rotor 13. In other words, the seal member 59 and the ball bearing 55 are disposed adjacent to each other in the direction of the x axis, and therefore the first embodiment can realize a further reduction in the axial dimension of the apparatus 1.

The motor housing 17 includes the adapter member 60 provided on the side of the steering housing 6 that is closer to the motor element 15 and fixed to the steering housing 6 by the bolt 19, and the cylindrical portion 57 coupled to the adapter member 60 by the bolt 61 and surrounding the outer peripheral side of the motor element 15. The cylindrical portion 57 includes the fitting portion 62 fitted so as to overlap the adapter member 60 in the direction of the x axis radially outside the adapter member 60. Thus, the fitting portion 62 overlaps the adapter member 60 in the direction of the x axis, and therefore the first embodiment can realize a reduction in the axial dimension of the apparatus 1. Further, the cylindrical portion 57 is located radially outside the adapter member 60, which leads to such a configuration that the outer peripheral surface of the cylindrical portion 57 is exposed to the outside. Therefore, the outer peripheral surface of the cylindrical portion 57 can be exposed over a wider area, which makes it possible to secure an area for attaching the signal transmission connectors 67 and 69, which are supposed to be mounted on this surface.

The steering housing 6 includes the lock nut containing hole 65 opened to the side that faces the motor housing 7, the female screw portion 64 in which the bolt 19 is screwed, the ball bearing 25 supporting the steering shaft 5 rotatably relative to the steering housing 6, and the lock nut 38 provided in the lock nut containing hole 65 and fixing the outer race 25a of the ball bearing 25 to the steering housing 6. The female screw portion 64 is provided so as to overlap the lock nut 38 in the direction of the x axis. In other words, the female screw portion 64 and the lock nut 38 are arranged so as to overlap each other in the direction of the x axis, and therefore the first embodiment can realize a further reduction in the axial dimension of the apparatus 1.

(Functional Advantage of Reduction in Number of Parts and Simplification of Configuration)

The resolver 16 includes the sensor rotor 48 configured to rotate together with the input shaft 2, and the sensor stator 49 that is provided radially outside the sensor rotor 48 and that is fixed to the inner housing 47. In other words, the power steering apparatus 1 according to the first embodiment is configured in such a manner that the inner housing 47 for the fixation of the sensor stator is fixed to the inner side of the motor housing 17, so that a portion where the inner housing 47 is fixed is not exposed to the outside, which eliminates the necessity of providing a seal structure on a surface where the inner housing 47 is coupled.

The motor housing 17 is fixed to the steering housing 6 with the resolver 16 exposed to the outside on the side thereof that faces the steering housing 6. Therefore, the apparatus 1 can be reduced in size and simplified in configuration due to the omission of a member for closing the side of the motor housing 17 where the resolver 16 is located. Further, the resolver 16 is exposed to the outside when being mounted, but the resolver 16 robust against dust, dirt, and the like is used as the rotational sensor, and therefore the first embodiment can realize simplification of a measure against the dust when the resolver 16 is mounted.

(Function of Improvement of Mountability)

The ball bearing 56 is disposed between the motor element 15 and the resolver 16 in the direction of the x axis. Therefore, the motor rotor 13 is already supported by the ball bearing 56 when the resolver 16 is mounted, and therefore the first embodiment can improve mountability of the resolver 16.

(Function of Improvement of Rotational Stability)

The apparatus 1 includes the ball bearing 56 fixed to the inner housing 47 and rotatably supporting the motor rotor 13. In this manner, the bearing is provided at the inner housing 47, and thereby the first embodiment can further improve rotational stability of the motor rotor 13.

The motor housing 17 includes the ball bearing 55 provided at the cover portion 58 and rotatably supporting the opposite end of the motor rotor 13 from the steering housing 6. Therefore, the end of the motor rotor 13 is supported by the ball bearing 55, and thus the first embodiment can improve the rotational stability of the motor rotor 13.

The first embodiment brings about advantageous effects that will be listed below.

(1) The first embodiment includes the steering shaft 5 including the input shaft 2 configured to rotate according to the operation of steering the steering wheel and the torsion bar containing portion 4 connected to the input shaft 2 via the torsion bar 3, the steering housing 6 rotatably supporting the steering shaft 5, the piston 9 provided in the steering housing 6 and dividing the inside of the steering housing 6 into the first pressure chamber 7 and the second pressure chamber 8, the control valve 10 provided in the steering housing 6 and configured to selectively supply the hydraulic fluid supplied from the pump due to the relative rotation between the input shaft 2 and the torsion bar containing portion 4 into the first pressure chamber 7 and the second pressure chamber 8, the conversion mechanism (the ball nut 11) configured to convert the rotation of the torsion bar containing portion 4 into the displacement of the piston 9 in the direction of the x axis, the transmission mechanism (the sector gear 12) configured to transmit the displacement of the piston 9 in the direction of the x axis to the steering wheel, and the hollow brushless motor 18. The hollow brushless motor 18 includes the motor element 15, the resolver 16, and the motor housing 17. The motor element 15 includes the motor rotor 13 provided around the outer periphery of the input shaft 2 assuming that the axial direction is the rotational axis of the steering shaft 5, and configured to rotate together with the input shaft 2, and the motor stator 14 provided around the outer periphery of the motor rotor 13. The resolver 16 is provided between the motor element 15 and the steering housing 6 in the direction of the x axis, and is configured to detect the rotational position of the motor rotor 13. The motor housing 17 contains the motor element 15 and the resolver 16 therein. The brushless motor 18 is configured to control the rotation of the input shaft 2 according to the operation status of the vehicle. The first embodiment further includes the bolt 19 provided between the motor element 15 and the steering housing 6 so as to overlap the resolver 16 in the direction of the x axis radially outside the resolver 16 assuming that the radial direction is the radial direction of the rotational axis of the steering shaft 5. The bolt 19 fixes the motor housing 17 to the steering housing 6.

In this manner, the bolt 19 is provided so as to overlap the resolver 16 in the direction of the x axis radially outside the resolver 16, the radial outside being the dead space. Thereby the first embodiment can realize a reduction in the axial dimension of the apparatus 1.

(2) The motor housing 17 includes the main body portion 46 surrounding the outer periphery of the motor element 15, and the inner housing 47 provided between the motor element 15 and the steering housing 6 in the direction of the x axis and fixed to the inner side of the main body portion 46. The resolver 16 includes the sensor rotor 48 configured to rotate together with the input shaft 2, and the sensor stator 49 provided radially outside the sensor rotor 48 and fixed to the inner housing 47.

In this manner, the first embodiment is configured in such a manner that the inner housing 47 for the fixation of the sensor stator is fixed to the inner side of the motor housing 17, so that the portion where the inner housing 47 is fixed is not exposed to the outside, which eliminates the necessity of providing a seal structure on the surface where the inner housing 47 is coupled.

(3) The motor stator 14 is the coil winding. The wiring 66, which supplies power to the coil winding, is disposed between the motor element 15 and the steering housing 6 in the direction of the x axis and radially outside the resolver 16.

In this manner, the power supply wiring 66 is disposed on the dead space, and thereby the first embodiment can realize a further reduction in the axial dimension of the apparatus 1.

(4) The motor housing 17 includes the cylindrical portion 57 surrounding the outer peripheral side of the motor element 15, and the cover portion 58 molded integrally with the cylindrical portion 57 and closing the opposite side of the cylindrical portion from the steering housing 6.

In this manner, the cylindrical portion 57 and the cover portion 58 of the motor housing 17 are molded integrally with each other, which eliminates the necessity of a bolt or the like for connecting the cylindrical portion 57 and the cover portion 58 to each other. Therefore, the first embodiment can realize a further reduction in the axial dimension of the apparatus 1.

(5) The first embodiment includes the steering shaft 5 including the input shaft 2 configured to rotate according to the operation of steering the steering wheel and the torsion bar containing portion 4 connected to the input shaft 2 via the torsion bar 3, the steering housing 6 rotatably supporting the steering shaft 5, the piston 9 provided in the steering housing 6 and dividing the inside of the steering housing 6 into the first pressure chamber 7 and the second pressure chamber 8, the control valve 10 provided in the steering housing 6 and configured to selectively supply the hydraulic fluid supplied from the pump due to the relative rotation between the input shaft 2 and the torsion bar containing portion 4 into the first pressure chamber 7 and the second pressure chamber 8, the conversion mechanism (the ball nut 11) configured to convert the rotation of the torsion bar containing portion 4 into the displacement of the piston 9 in the direction of the x axis, the transmission mechanism (the sector gear 12) configured to transmit the displacement of the piston 9 in the direction of the x axis to the steering wheel, and the hollow brushless motor 18. The hollow brushless motor 18 includes the motor element 15, the resolver 16, and the motor housing 17. The motor element 15 includes the motor rotor 13 provided around the outer periphery of the input shaft 2 assuming that the direction of the x axis is the rotational axis of the steering shaft 5, and configured to rotate together with the input shaft 2, and the motor stator 14 that is the coil winding provided around the outer periphery of the motor rotor 13. The resolver 16 is provided between the motor element 15 and the steering housing 6 in the direction of the x axis, and is configured to detect the rotational position of the motor rotor 13. The motor housing 17 contains the motor element 15 and the resolver 16 therein and is also fixed to the steering housing 6. The brushless motor 18 is configured to control the rotation of the input shaft 2 according to the operation status of the vehicle. The first embodiment further includes the wiring 66 provided between the motor element 15 and the steering housing 6 so as to overlap the resolver 16 in the direction of the x axis radially outside the resolver 16 assuming that the radial direction is the radial direction of the rotational axis of the steering shaft 5. The wiring 66 supplies power to the motor stator 14.

In this manner, the wiring 66 for supplying power is provided so as to overlap the resolver 16 in the direction of the x axis radially outside the resolver 16, the radial outside being the dead space, and thereby the first embodiment can realize a reduction in the axial dimension of the apparatus 1.

Second Embodiment

Figure 6:
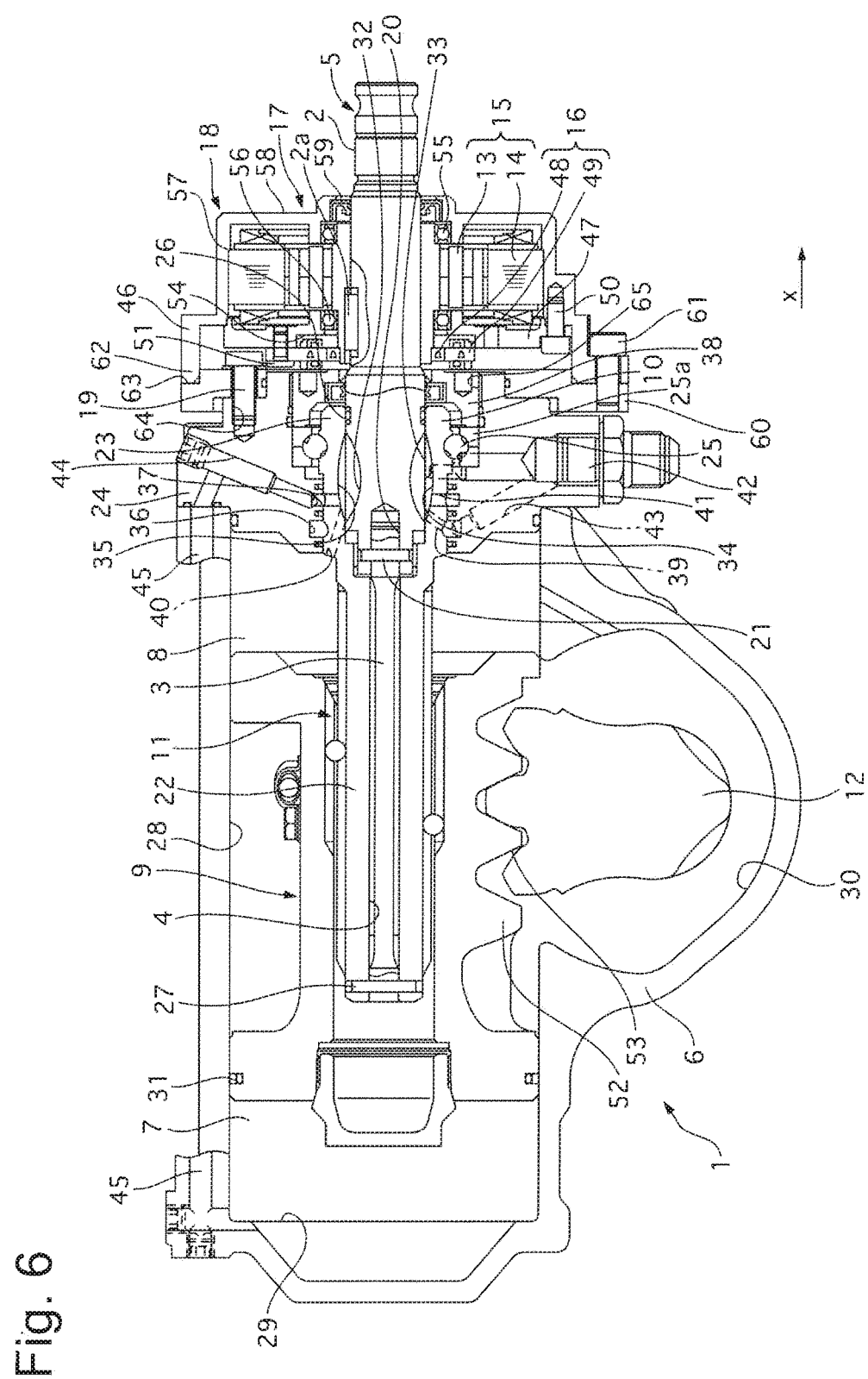
FIG. 6 is a combination of a vertical cross-sectional view of the steering housing 6 and a cross-sectional view of the motor housing 17 taken along the line A-A according to a second embodiment.
Figure 7:
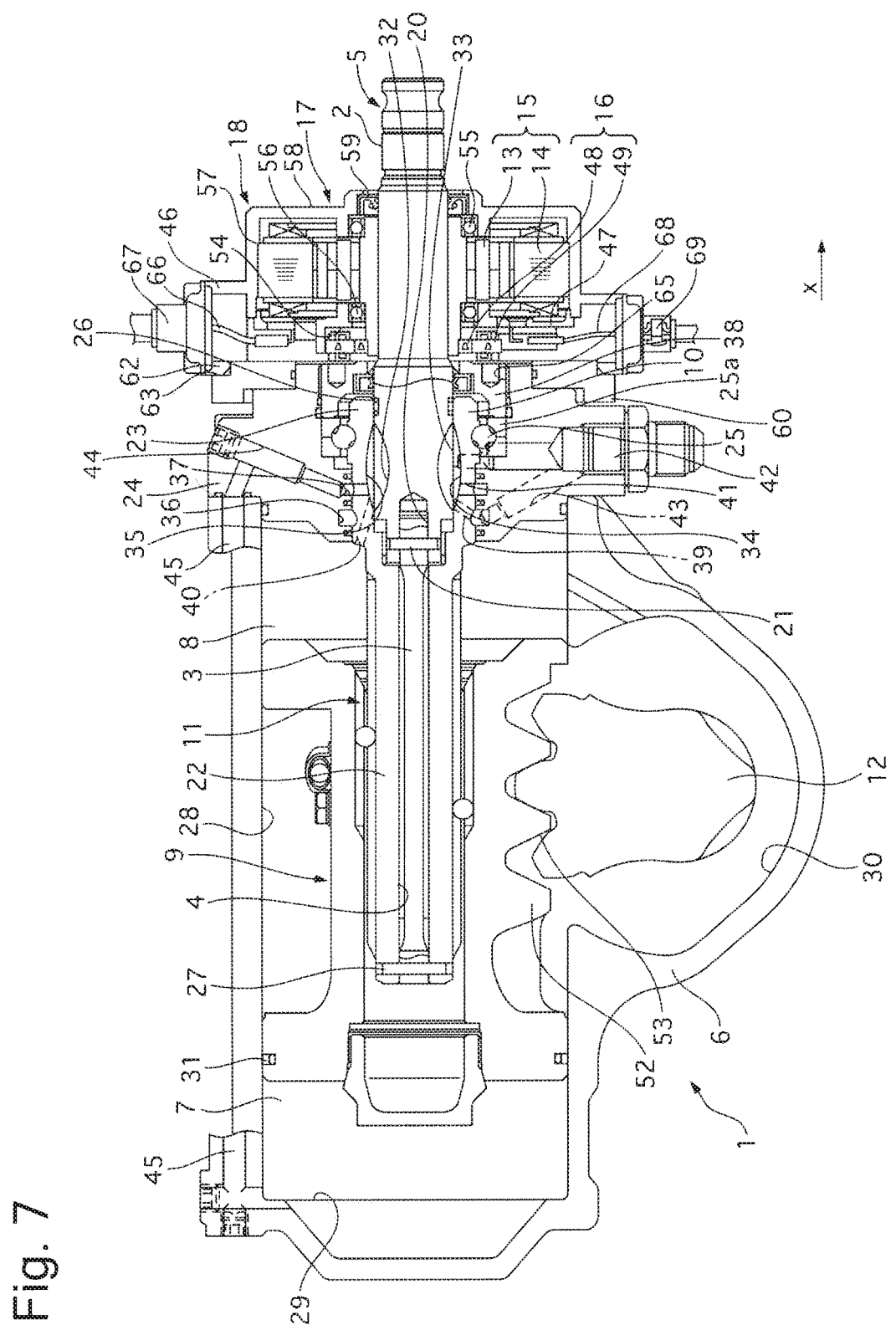
FIG. 7 is a combination of the vertical cross-sectional view of the steering housing 6 and a cross-sectional view of the motor housing 17 taken along the line B-B according to the second embodiment.
Figure 8:
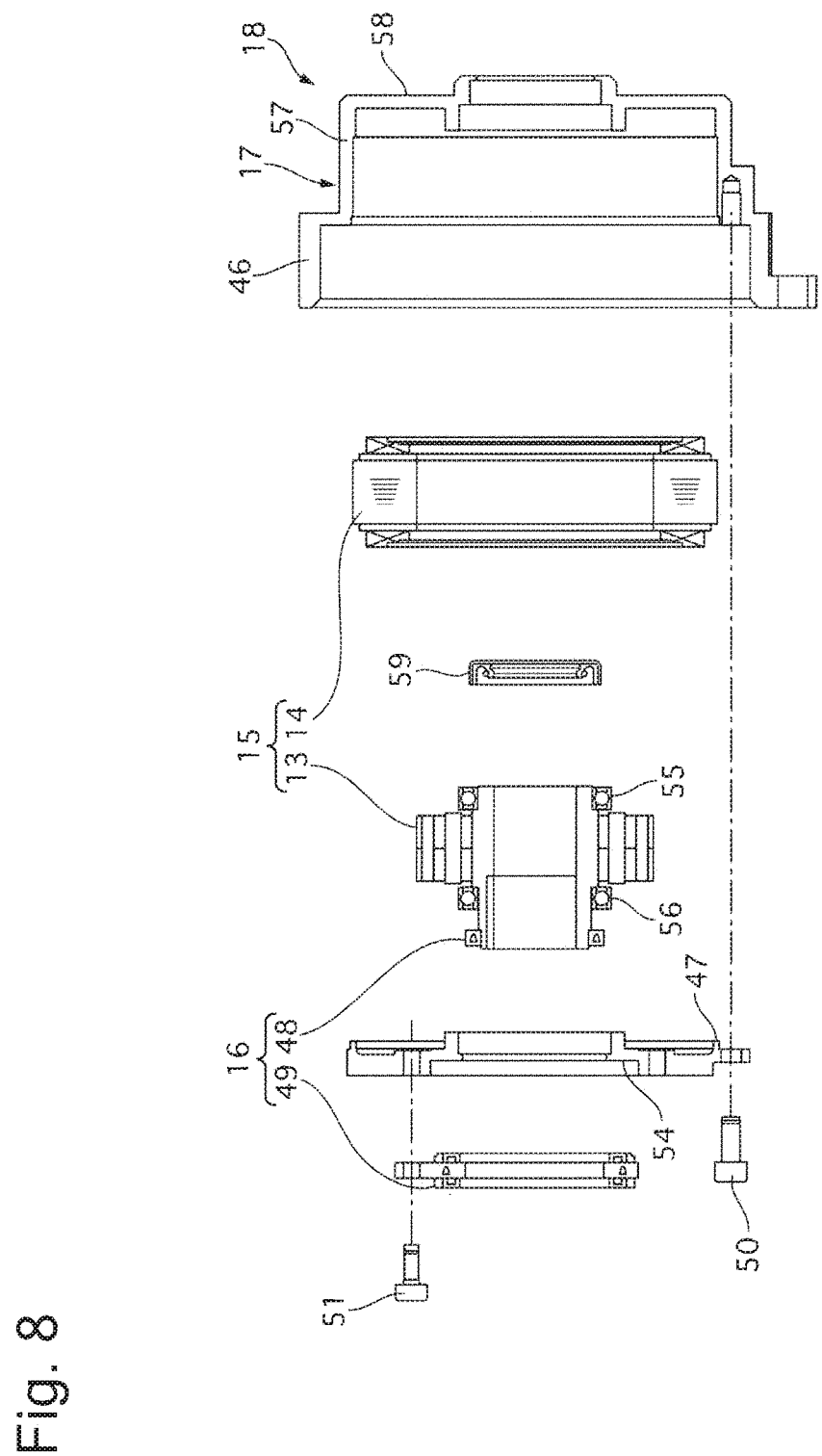
FIG. 8 is an exploded side view of the brushless motor 18 according to the second embodiment.
Figure 9:
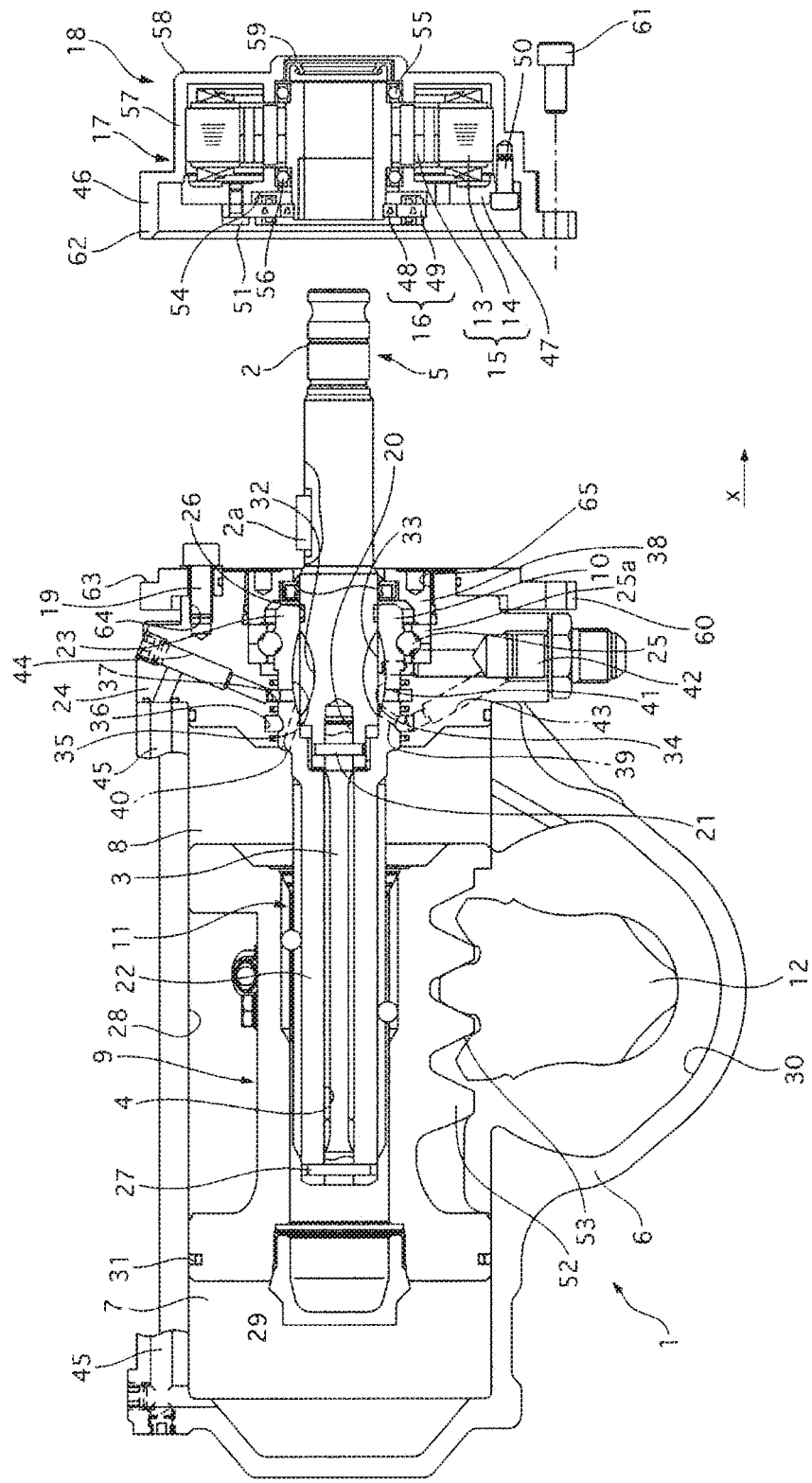
FIG. 9 is a side view illustrating the steering housing 6 and the brushless motor 18 separated from each other according to the second embodiment.

FIG. 6 is a combination of a vertical cross-sectional view of the steering housing 6 and a cross-sectional view of the motor housing 17 taken along the line A-A according to a second embodiment. FIG. 7 is a combination of the vertical cross-sectional view of the steering housing 6 and a cross-sectional view of the motor housing 17 taken along the line B-B. FIG. 8 is an exploded side view of the brushless motor 18. FIG. 9 is a side view illustrating the steering housing 6 and the brushless motor 18 separated from each other.

The second embodiment is different from the first embodiment in terms of including only the single resolver 16. Further, in the second embodiment, the resolver 16 includes doubly wound windings as the sensor stator 49, i.e., includes two sets of stator windings that are alternately wound around teeth, and extracts signals of both of the windings to detect the rotational position.

In this manner, the second embodiment includes only the single resolver 16, and therefore can reduce an axial dimension of the motor housing 17 to thereby realize a further reduction in the axial dimension of the apparatus 1 compared to the first embodiment including the two resolvers 16. Further, the second embodiment includes the doubly wound windings of the resolver 16, and therefore can redundantly configure the resolver 16 while realizing the reduction in the axial dimension.

Third Embodiment

Figure 10:
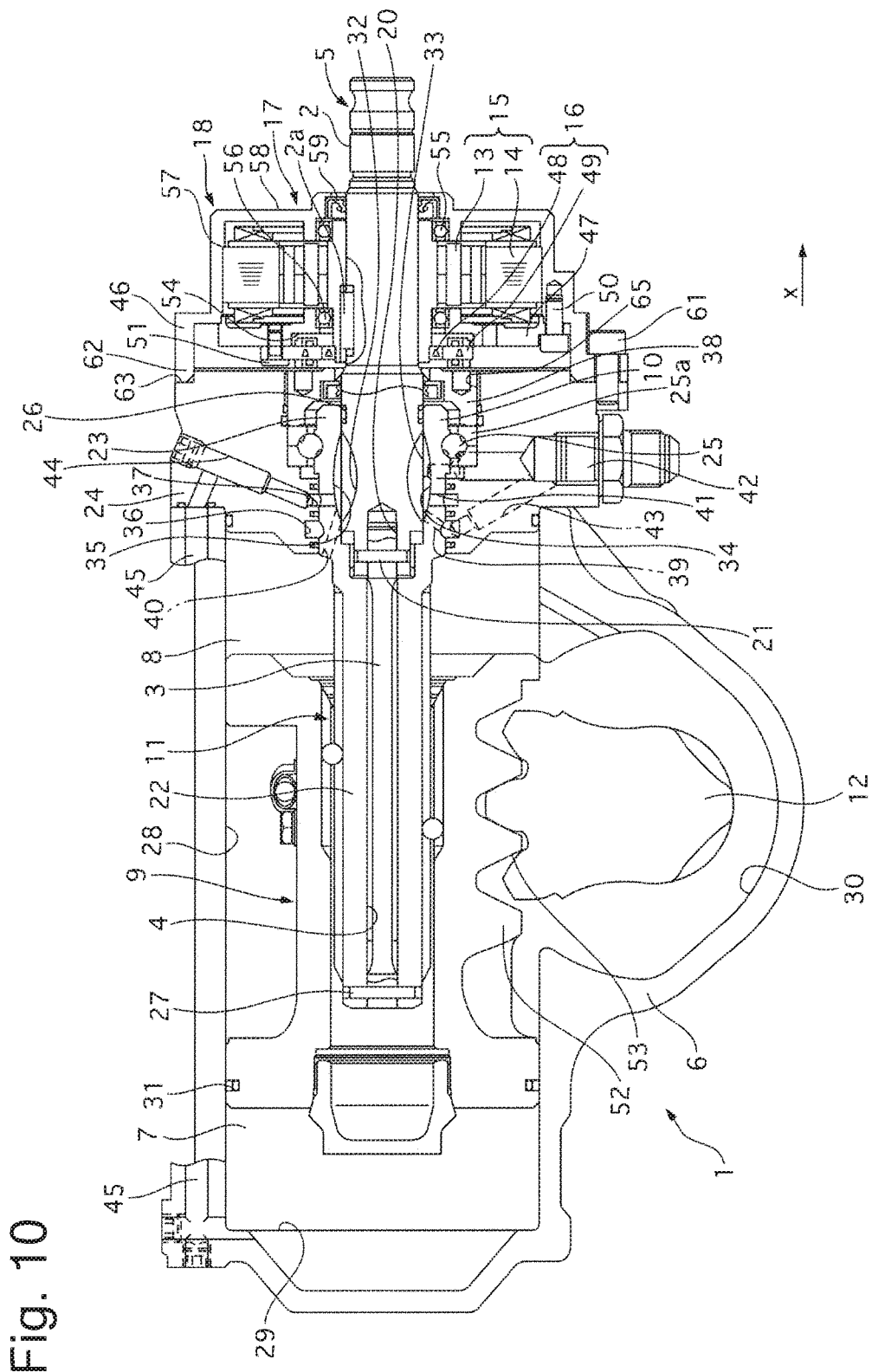
FIG. 10 is a combination of a vertical cross-sectional view of the steering housing 6 and a cross-sectional view of the motor housing 17 taken along the line A-A according to a third embodiment.

FIG. 10 is a combination of a vertical cross-sectional view of the steering housing 6 and a cross-sectional view of the motor housing 17 taken along the line A-A according to a third embodiment.

The third embodiment is different from the second embodiment in terms of omission of the adapter member 60. The employment of this configuration eliminates the necessity of the adapter member 60 and the bolt 61 for fixing the adapter member 60 to the cylindrical portion 57, and therefore can realize a reduction in the number of parts compared to the first and second embodiments.

Fourth Embodiment

Figure 11:
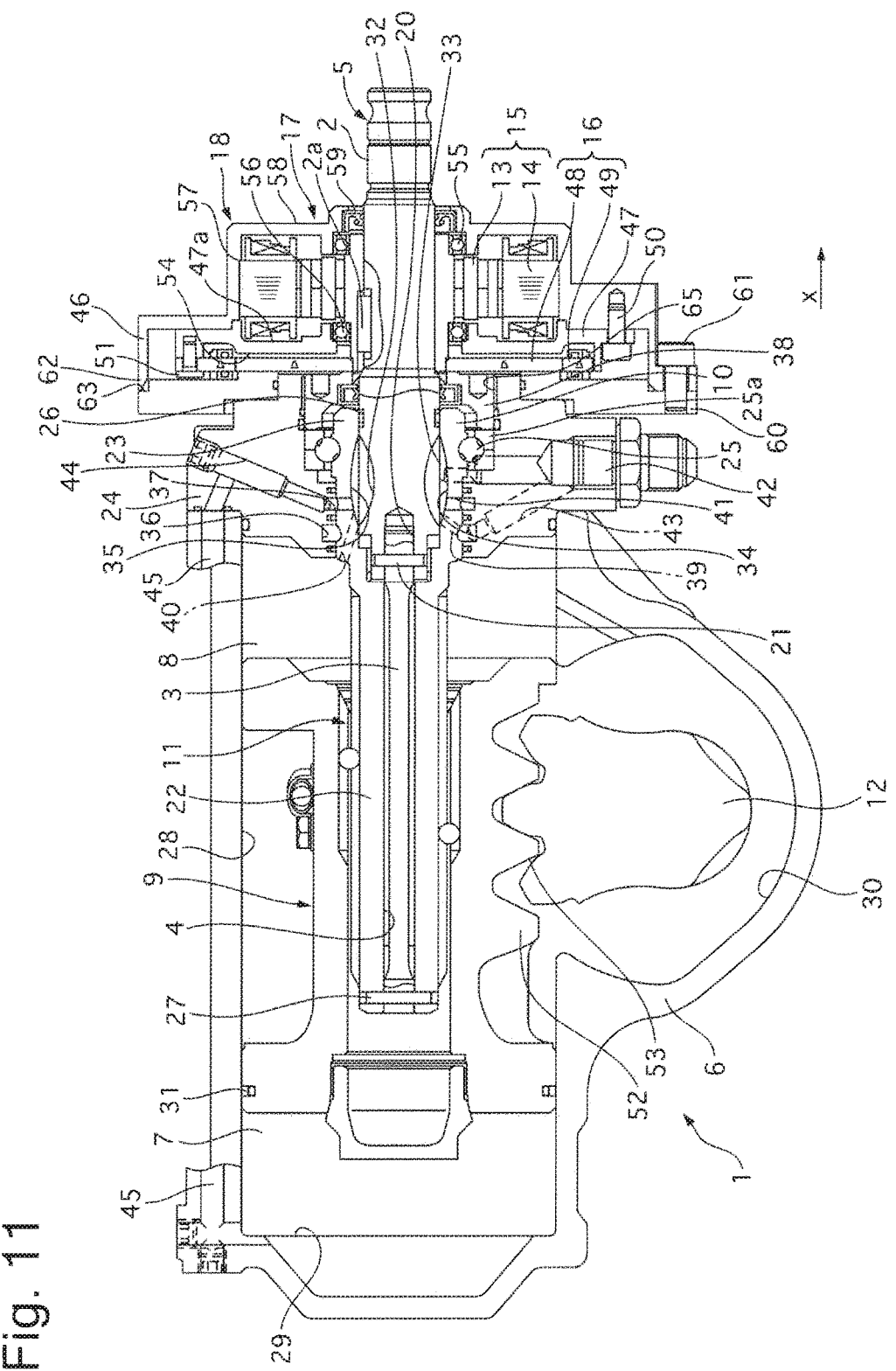
FIG. 11 is a combination of a vertical cross-sectional view of the steering housing 6 and a cross-sectional view of the motor housing 17 taken along the line A-A according to a fourth embodiment.
Figure 12:
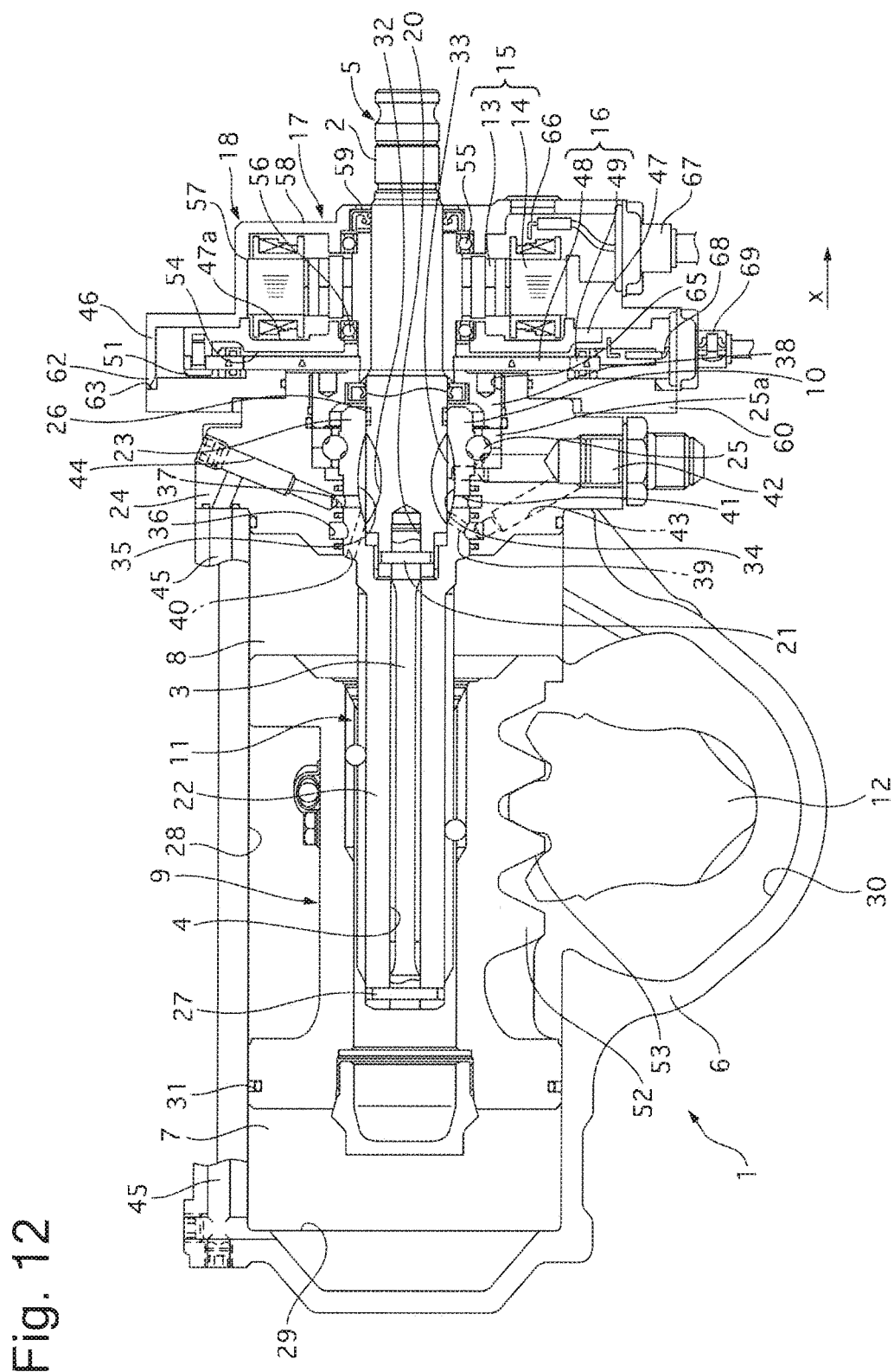
FIG. 12 is a combination of the vertical cross-sectional view of the steering housing 6 and a cross-sectional view of the motor housing 17 taken along the line B-B according to the fourth embodiment.

FIG. 11 is a combination of a vertical cross-sectional view of the steering housing 6 and a cross-sectional view of the motor housing 17 taken along the line A-A according to a fourth embodiment. FIG. 12 is a combination of the vertical cross-sectional view of the steering housing 6 and a cross-sectional view of the motor housing 17 taken along the line B-B.

The fourth embodiment is different from the second embodiment in terms of the resolver 16 having a larger outer diameter than an outer diameter of the motor stator 14. An outer diameter of the inner housing 47 also increases according to an increase in an outer diameter of the sensor rotor 48. A recessed portion 47a is provided on the positive side of the inner housing 47 that is located in the positive direction of the x axis, and the motor stator 14 is disposed so as to partially enter the recessed portion 47a from the positive side located in the positive direction of the x axis. A position of the wiring 66, which supplies power to the motor stator 14 (the coil winding), and a position of the connector 67 are changed to positions on the positive side located in the positive direction of the x axis with respect to the motor stator 14.

In the fourth embodiment, the inner housing 47 and the motor element 15 are located so as to overlap each other in the direction of the x axis. Therefore, the fourth embodiment can reduce the axial dimension of the motor housing 17, thereby realizing a further reduction in the axial dimension of the apparatus 1 compared to the second embodiment.

Fifth Embodiment

Figure 13:
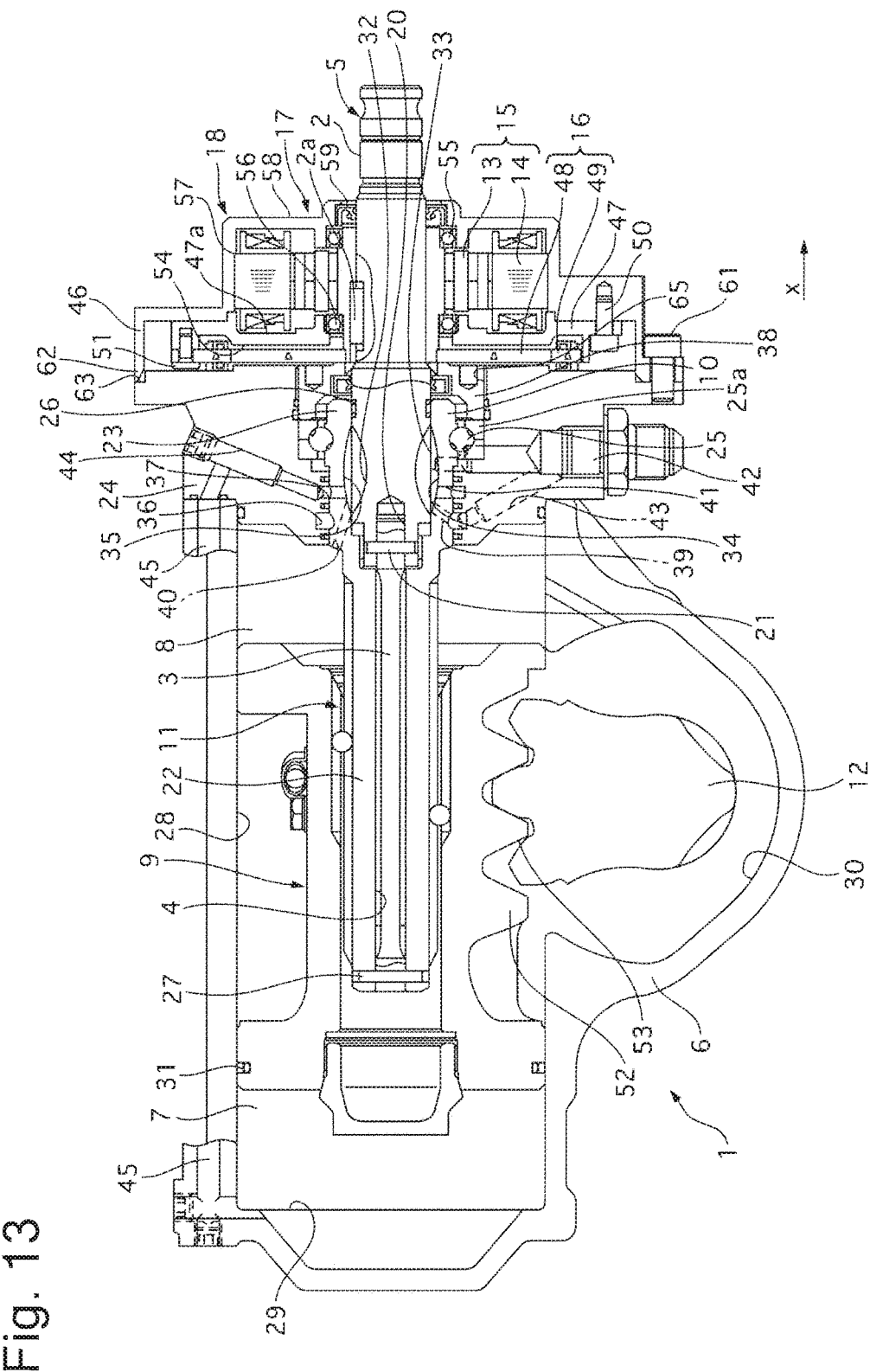
FIG. 13 is a combination of a vertical cross-sectional view of the steering housing 6 and a cross-sectional view of the motor housing 17 taken along the line A-A according to a fifth embodiment.
Figure 14:
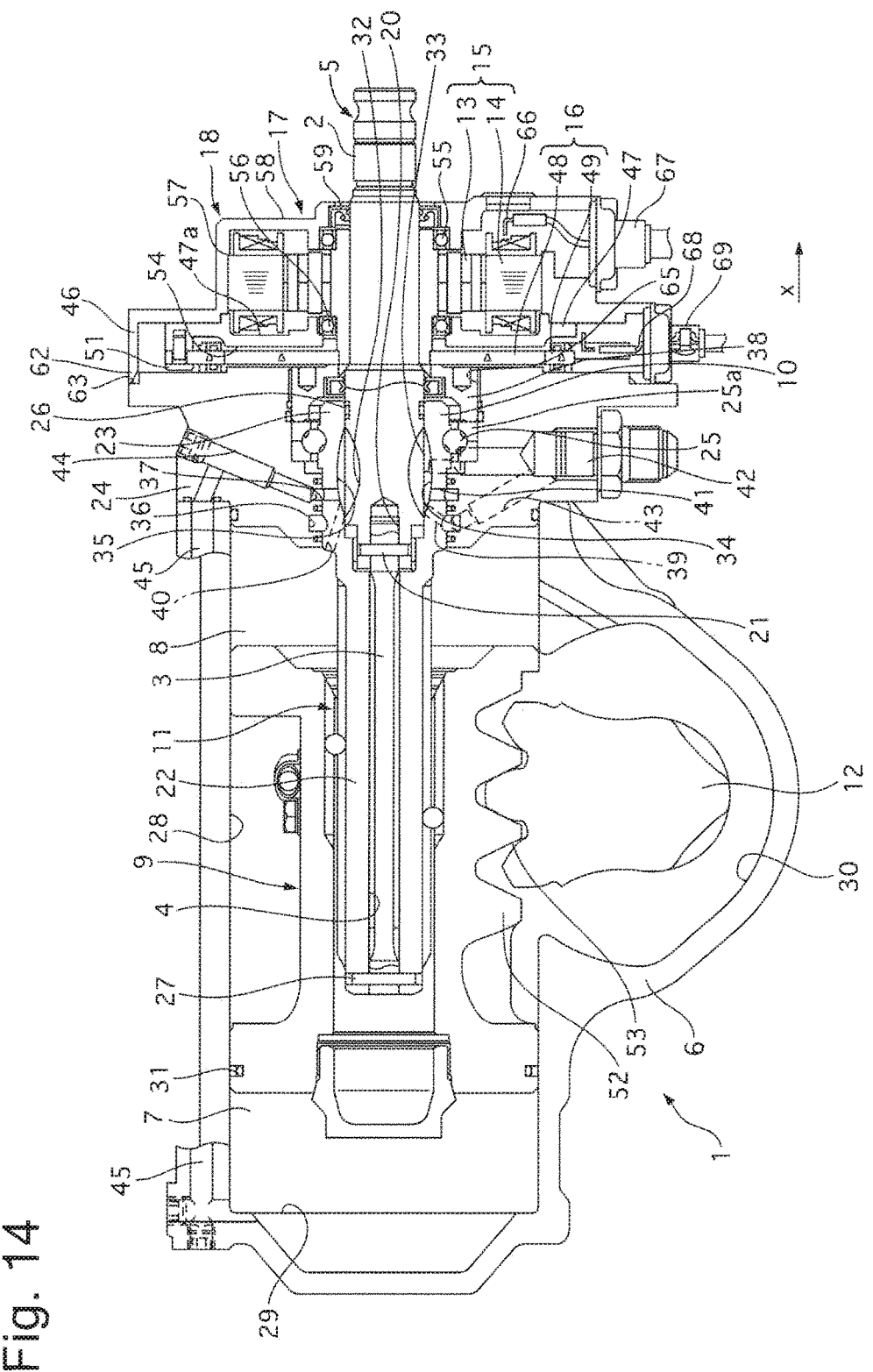
FIG. 14 is a combination of the vertical cross-sectional view of the steering housing 6 and a cross-sectional view of the motor housing 17 taken along the line B-B according to the fifth embodiment.

FIG. 13 is a combination of a vertical cross-sectional view of the steering housing 6 and a cross-sectional view of the motor housing 17 taken along the line A-A according to a fifth embodiment. FIG. 14 is a combination of the vertical cross-sectional view of the steering housing 6 and a cross-sectional view of the motor housing 17 taken along the line B-B.

The fifth embodiment is different from the fourth embodiment in terms of omission of the adapter member 60. The employment of this configuration eliminates the necessity of the adapter member 60 and the bolt 61 for fixing the adapter member 60 to the cylindrical portion 57, and therefore can realize a reduction in the number of parts compared to the first, second, and fourth embodiments.

Embodiments according to the present invention may also be configured in the following manner.

(1) A power steering apparatus includes a steering shaft including an input shaft configured to rotate according to an operation of steering a steering wheel and an output shaft connected to the input shaft via a torsion bar, a steering housing rotatably supporting the steering shaft, a piston provided in the steering housing and dividing an inside of the steering housing into a first pressure chamber and a second pressure chamber, a control valve provided in the steering housing and configured to selectively supply hydraulic fluid supplied from a pump due to a relative rotation between the input shaft and the output shaft into the first pressure chamber and the second pressure chamber, a conversion mechanism (a ball nut) configured to convert a rotation of the output shaft into a displacement of the piston in an axial direction, a transmission mechanism (a sector shaft and a pitman arm) configured to transmit the displacement of the piston in the axial direction to a steering wheel, and a hollow brushless motor including a motor element, a rotational sensor, and a motor housing.

The motor element includes a motor rotor provided around an outer periphery of the input shaft assuming that the axial direction is a rotational axis of the steering shaft and configured to rotate together with the input shaft, and a motor stator provided around an outer periphery of the motor rotor. The rotational sensor is provided between the motor element and the steering housing in the axial direction and is configured to detect a rotational position of the motor rotor. The motor housing contains the motor element and the rotational sensor therein. The brushless motor is configured to control a rotation of the input shaft according to an operation status of a vehicle.

The power steering apparatus further includes a fixation member (a bolt) that is provided between the motor element and the steering housing so as to overlap the rotational sensor in the axial direction and is provided radially outside the rotational sensor, assuming that the radial direction is a radial direction of the rotational axis of the steering shaft. The fixation member fixes the motor housing to the steering housing.

The control of the rotation of the input shaft also includes performing control so as to prohibit the input shaft from rotating.

According to this configuration, the fixation member is arranged so as to overlap the rotational sensor in the axial direction radially outside the rotational sensor, the radial outside being a dead space, which can realize a reduction in the axial dimension of the apparatus.

(2) In the power steering apparatus described in item (1), the motor housing may include an inner housing provided between the motor element and the steering housing in the axial direction and fixed to an inner side of the motor housing. The rotational sensor may include a sensor rotor configured to rotate together with the input shaft, and a sensor stator provided radially outside the sensor rotor and fixed to the inner housing.

According to this configuration, the power steering apparatus is configured in such a manner that the inner housing for the fixation of the sensor stator is fixed to the inner side of the motor housing, so that a portion where the inner housing is fixed is not exposed to the outside, which eliminates the necessity of providing a seal structure on a surface where the inner housing is coupled.

(3) The power steering apparatus described in item (2) may further include a sensor stator fixation bolt fixing the sensor stator to the inner housing. The sensor stator fixation bolt may be provided so as to overlap the rotational sensor in the axial direction.

According to this configuration, the sensor stator fixation bolt is arranged so as to overlap the rotational sensor in the axial direction, which can prevent or cut down an increase in the axial dimension.

(4) In the power steering apparatus described in item (3), the inner housing may include a recessed portion opened to a side that faces the rotational sensor in the axial direction. The rotational sensor may be disposed so as to enter the recessed portion in the axial direction.

According to this configuration, the axial dimension of the apparatus can be further reduced.

(5) The power steering apparatus described in item (2) may further include a sensor stator fixation bolt fixing the sensor stator to the inner housing. The sensor stator fixation bolt may be provided so as to overlap the fixation member in the axial direction.

According to this configuration, the sensor stator fixation bolt is arranged so as to overlap the fixation member in the axial direction, which can prevent or cut down an increase in the axial dimension.

(6) The power steering apparatus described in item (2) may further include a lower bearing fixed to the inner housing and rotatably supporting the motor rotor.

According to this configuration, the bearing is provided at the inner housing, which can improve rotational stability of the motor rotor.

(7) In the power steering apparatus described in item (6), the lower bearing may be disposed between the motor element and the rotational sensor in the axial direction.

According to this configuration, the motor rotor is already supported by the bearing when the rotational sensor is mounted, which can improve mountability of the rotational sensor.

(8) In the power steering apparatus described in item (1), the motor stator may be a coil winding. A wiring that supplies power to the coil winding may be disposed between the motor element and the steering housing in the axial direction radially outside the rotational sensor.

According to this configuration, the power supply wiring is disposed on the dead space, which can realize a further reduction in the axial dimension of the apparatus.

(9) In the power steering apparatus described in item (1), the motor housing may include a cylindrical portion surrounding an outer peripheral side of the motor element, and a cover portion molded integrally with the cylindrical portion and closing an opposite side of the cylindrical portion from the steering housing.

According to this configuration, the cylindrical portion and the cover portion of the motor housing are molded integrally with each other, which eliminates the necessity of a bolt or the like for connecting the cylindrical portion and the cover portion to each other, thereby realizing a further reduction in the axial dimension of the apparatus.

(10) In the power steering apparatus described in item (9), the motor housing may include a seal member provided at the cover portion and sealing between the motor housing and the input shaft, and an upper bearing provided at the cover portion so as to be located adjacent to the seal member in the axial direction and rotatably supporting the motor rotor.

According to this configuration, the seal member and the ball bearing are disposed adjacent to each other in the axial direction, which can realize a further reduction in the axial dimension of the apparatus.

(11) In the power steering apparatus described in item (9), the motor housing may include an upper bearing provided at the cover portion and rotatably supporting an opposite end of the motor rotor from the steering housing.

According to this configuration, the end of the motor rotor is supported by the bearing, which can improve the rotational stability of the motor rotor.

(12) In the power steering apparatus described in item (1), the rotational sensor may be a resolver. The motor housing may be fixed to the steering housing with the rotational sensor exposed to an outside on a side thereof that faces the steering housing.

According to this configuration, the apparatus can be reduced in size and simplified in configuration due to the omission of a member for closing the side of the motor housing that is closer to the rotational sensor. Further, the rotational sensor is exposed to the outside when being mounted, but the resolver robust against dust, dirt, and the like is used as the rotational sensor, which allows simplification of a measure against the dust when the rotational sensor is mounted.

(13) In the power steering apparatus described in item (1), the motor housing may include an adapter member provided on a side of the steering housing that is closer to the motor element and fixed to the steering housing by the fixation member, and a cylindrical portion coupled to the adapter member by a bolt and surrounding an outer peripheral side of the motor element. The cylindrical portion of the motor housing may include a fitting portion fitted so as to overlap the adapter member in the axial direction radially outside the adapter member.

According to this configuration, the fitting portion overlaps the adapter member in the axial direction, which can realize a reduction in the axial dimension of the apparatus. Further, the cylindrical portion is located radially outside the adapter member, which leads to such a configuration that an outer peripheral surface of the cylindrical portion is exposed to the outside. Therefore, the outer peripheral surface of the cylindrical portion can be exposed over a wider area, which makes it possible to secure an area for attaching a signal transmission connector, which is supposed to be mounted on this surface.

(14) In the power steering apparatus described in item (1), the fixation member may be a bolt. The steering housing may include a lock nut containing hole opened to a side that faces the motor housing, a female screw portion in which the bolt as the fixation member is screwed, a ball bearing supporting the steering shaft rotatably relative to the steering housing, and a lock nut provided in the lock nut containing hole and fixing an outer race of the ball bearing to the steering housing. The female screw portion may be provided so as to overlap the lock nut in the axial direction.

According to this configuration, the female screw portion is provided so as to overlap the lock nut in the axial direction, which can realize a further reduction in the axial dimension of the apparatus.

(15) A power steering apparatus includes
a steering shaft including an input shaft configured to rotate according to an operation of steering a steering wheel and an output shaft connected to the input shaft via a torsion bar, a steering housing rotatably supporting the steering shaft, a piston provided in the steering housing and dividing an inside of the steering housing into a first pressure chamber and a second pressure chamber, a control valve provided in the steering housing and configured to selectively supply hydraulic fluid supplied from a pump due to a relative rotation between the input shaft and the output shaft into the first pressure chamber and the second pressure chamber, a conversion mechanism (a ball nut) configured to convert a rotation of the output shaft into a displacement of the piston in an axial direction, a transmission mechanism (a sector shaft and a pitman arm) configured to transmit the displacement of the piston in the axial direction to a steering wheel, and a hollow brushless motor including a motor element, a rotational sensor, and a motor housing.

The motor element includes a motor rotor provided around an outer periphery of the input shaft assuming that the axial direction is a rotational axis of the steering shaft and configured to rotate together with the input shaft, and a motor stator that is a coil winding provided around an outer periphery of the motor rotor. The rotational sensor is provided between the motor element and the steering housing in the axial direction and is configured to detect a rotational position of the motor rotor. The motor housing contains the motor element and the rotational sensor therein and is also fixed to the steering housing. The brushless motor is configured to control a rotation of the input shaft according to an operation status of a vehicle.

The power steering apparatus further includes a wiring that is provided between the motor element and the steering housing so as to overlap the rotational sensor in the axial direction that is provided radially outside the rotational sensor assuming that the radial direction is a radial direction of the rotational axis of the steering shaft. The wiring is configured to supply power to the motor stator.

According to this configuration, the power supply wiring is provided so as to overlap the rotational sensor in the axial direction radially outside the rotational sensor, the radial outside being the dead space, which can realize a reduction in the axial dimension of the apparatus.

(16) In the power steering apparatus described in item (15), the motor housing may include a cylindrical portion surrounding an outer peripheral side of the motor element, and a cover portion molded integrally with the cylindrical portion and closing an opposite side of the cylindrical portion from the steering housing.

According to this configuration, the cylindrical portion and the cover portion of the motor housing are molded integrally with each other, which eliminates the necessity of a bolt or the like for connecting the cylindrical portion and the cover portion with each other, thereby realizing a further reduction in the axial dimension of the apparatus.

(17) In the power steering apparatus described in item (16), the motor housing may include a seal member provided at the cover portion and sealing between the motor housing and the input shaft, and an upper bearing provided at the cover portion so as to be located adjacent to the seal member in the axial direction and rotatably supporting the motor rotor.

According to this configuration, the seal member and the ball bearing are disposed adjacent to each other in the axial direction, which can realize a further reduction in the axial dimension of the apparatus.

(18) In the power steering apparatus described in item (15), the motor housing may include an inner housing provided between the motor element and the steering housing in the axial direction and fixed to an inner side of the motor housing. The rotational sensor may include a sensor rotor configured to rotate together with the input shaft, and a sensor stator provided radially outside the sensor rotor and fixed to the inner housing.

According to this configuration, the power steering apparatus is configured in such a manner that the inner housing for the fixation of the sensor stator is fixed to the inner side of the motor housing, so that a portion where the inner housing is fixed is not exposed to the outside, which eliminates the necessity of providing a seal structure on a surface where the inner housing is coupled.

(19) The power steering apparatus described in item (18) may further include a sensor stator fixation bolt fixing the sensor stator to the inner housing. The sensor stator fixation bolt may be provided so as to overlap the rotational sensor in the axial direction.

According to this configuration, the sensor stator fixation bolt is provided so as to overlap the fixation member in the axial direction, which can prevent or cut down an increase in the axial dimension.

(20) In the power steering apparatus described in item (19), the inner housing may include a recessed portion opened to a side that faces the rotational sensor in the axial direction. The rotational sensor may be disposed so as to enter the recessed portion in the axial direction.

According to this configuration, the axial dimension of the apparatus can be further reduced.

Having described merely several embodiments of the present invention, it is apparent to those skilled in the art that the embodiments described as examples can be changed or improved in various manners without substantially departing from the novel teachings and advantages of the present invention. Therefore, such embodiments changed or improved in various manners are intended to be also contained in the technical scope of the present invention.

The above-described embodiments may be arbitrarily combined.

The present application claims priority under the Paris Convention to Japanese Patent Application No. 2014-019084 filed on Feb. 4, 2014. The entire disclosure of Japanese Patent Application No. 2014-019084 filed on Feb. 4, 2014 including the specification, the claims, the drawings, and the summary is incorporated herein by reference in its entirety.

REFERENCE SIGNS LIST 1 integral power steering
2 input shaft
3 torsion bar
4 torsion bar containing portion (output shaft)
5 steering shaft
6 steering housing
7 first pressure chamber
8 second pressure chamber
9 piston
10 control valve
11 ball nut (conversion mechanism)
12 sector gear (transmission mechanism)
13 motor rotor
14 motor stator
15 motor element
16 resolve (rotational sensor)
17 motor housing
18 brushless motor
19 bolt (fixation member)
66 wiring

The invention claimed is:

1. A power steering apparatus comprising:
a steering shaft including an input shaft configured to rotate according to an operation of steering a steering wheel, and an output shaft connected to the input shaft via a torsion bar;
a steering housing rotatably supporting the steering shaft;
a piston provided in the steering housing and dividing an inside of the steering housing into a first pressure chamber and a second pressure chamber;
a control valve provided in the steering housing and configured to selectively supply hydraulic fluid supplied from a pump due to relative rotation between the input shaft and the output shaft into the first pressure chamber and the second pressure chamber;
a conversion mechanism configured to convert rotation of the output shaft into a displacement of the piston in an axial direction;
a transmission mechanism configured to transmit the displacement of the piston in the axial direction to a steering wheel;
a hollow brushless motor including a motor element, a rotational sensor, and a motor housing,
the motor element including a motor rotor provided around an outer periphery of the input shaft, the axial direction being a rotational axis of the steering shaft, and configured to rotate together with the input shaft, and a motor stator provided around an outer periphery of the motor rotor,
the rotational sensor being provided between the motor element and the steering housing in the axial direction and being configured to detect a rotational position of the motor rotor,
the motor housing containing the motor element and the rotational sensor therein,
the brushless motor being configured to control rotation of the input shaft according to an operation status of a vehicle; and
a fixation member that is provided between the motor element and the steering housing so as to overlap the rotational sensor as viewed from the radial direction and that is provided radially outside the rotational sensor, the radial direction being a radial direction of the rotational axis of the steering shaft, the fixation member fixing the motor housing to the steering housing.

2. The power steering apparatus according to claim 1, wherein the motor housing includes an inner housing provided between the motor element and the steering housing in the axial direction, and fixed to an inner side of the motor housing, and
wherein the rotational sensor includes a sensor rotor configured to rotate together with the input shaft, and a sensor stator provided radially outside the sensor rotor and fixed to the inner housing.

3. The power steering apparatus according to claim 2, further comprising a sensor stator fixation bolt fixing the sensor stator to the inner housing, the sensor stator fixation bolt being provided so as to overlap the rotational sensor in the axial direction.

4. The power steering apparatus according to claim 3, wherein the inner housing includes a recessed portion opened to a side that faces the rotational sensor in the axial direction, and
wherein the rotational sensor is disposed so as to enter the recessed portion in the axial direction.

5. The power steering apparatus according to claim 2, further comprising a sensor stator fixation bolt fixing the sensor stator to the inner housing, the sensor stator fixation bolt being provided so as to overlap the fixation member as viewed from the radial direction.

6. The power steering apparatus according to claim 2, further comprising a lower bearing fixed to the inner housing and rotatably supporting the motor rotor.

7. The power steering apparatus according to claim 6, wherein the lower bearing is disposed between the motor element and the rotational sensor in the axial direction.

8. The power steering apparatus according to claim 1, wherein the motor stator is a coil winding, and
wherein a wiring that supplies power to the coil winding is disposed between the motor element and the steering housing in the axial direction radially outside the rotational sensor.

9. The power steering apparatus according to claim 1, wherein the motor housing includes a cylindrical portion surrounding an outer peripheral side of the motor element, and a cover portion molded integrally with the cylindrical portion and closing an opposite side of the cylindrical portion from the steering housing.

10. The power steering apparatus according to claim 9, wherein the motor housing includes a seal member provided at the cover portion and sealing between the motor housing and the input shaft, and an upper bearing provided at the cover portion so as to be located adjacent to the seal member in the axial direction and rotatably supporting the motor rotor.

11. The power steering apparatus according to claim 9, wherein the motor housing includes an upper bearing provided at the cover portion and rotatably supporting an opposite end of the motor rotor from the steering housing.

12. The power steering apparatus according to claim 1, wherein the rotational sensor is a resolver, and
wherein the motor housing is fixed to the steering housing with the rotational sensor exposed to an outside on a side thereof that faces the steering housing.

13. The power steering apparatus according to claim 1, wherein the motor housing includes an adapter member provided on a side of the steering housing that is closer to the motor element and fixed to the steering housing by the fixation member, and a cylindrical portion coupled to the adapter member by a bolt and surrounding an outer peripheral side of the motor element, and
wherein the cylindrical portion of the motor housing includes a fitting portion fitted so as to overlap the adapter member in the axial direction radially outside the adapter member.

14. The power steering apparatus according to claim 1, wherein the fixation member is a bolt,
wherein the steering housing includes a lock nut containing hole opened on a side that faces the motor housing, a female screw portion in which the bolt as the fixation member is screwed, a ball bearing supporting the steering shaft rotatably relative to the steering housing, and a lock nut provided in the lock nut containing hole and fixing an outer race of the ball bearing to the steering housing, and
wherein the female screw portion is provided so as to overlap the lock nut in the axial direction.

15. A power steering apparatus comprising:
a steering shaft including an input shaft configured to rotate according to an operation of steering a steering wheel, and an output shaft connected to the input shaft via a torsion bar;
a steering housing rotatably supporting the steering shaft;
a piston provided in the steering housing and dividing an inside of the steering housing into a first pressure chamber and a second pressure chamber;
a control valve provided in the steering housing and configured to selectively supply hydraulic fluid supplied from a pump due to relative rotation between the input shaft and the output shaft into the first pressure chamber and the second pressure chamber;
a conversion mechanism configured to convert rotation of the output shaft into a displacement of the piston in an axial direction;
a transmission mechanism configured to transmit the displacement of the piston in the axial direction to a steering wheel;
a hollow brushless motor including a motor element, a rotational sensor, and a motor housing,
the motor element including a motor rotor provided around an outer periphery of the input shaft, the axial direction being a rotational axis of the steering shaft, and configured to rotate together with the input shaft, and a motor stator that is a coil winding provided around an outer periphery of the motor rotor,
the rotational sensor being provided between the motor element and the steering housing in the axial direction and being configured to detect a rotational position of the motor rotor,
the motor housing containing the motor element and the rotational sensor therein and also fixed to the steering housing,
the brushless motor being configured to control rotation of the input shaft according to an operation status of a vehicle; and
a wiring provided between the motor element and the steering housing in the axial direction radially outside the rotational sensor, the radial direction being a radial direction of the rotational axis of the steering shaft, the wiring being configured to supply power to the motor stator.

16. The power steering apparatus according to claim 15, wherein the motor housing includes a cylindrical portion surrounding an outer peripheral side of the motor element, and a cover portion molded integrally with the cylindrical portion and closing an opposite side of the cylindrical portion from the steering housing.

17. The power steering apparatus according to claim 16, wherein the motor housing includes a seal member provided at the cover portion and sealing between the motor housing and the input shaft, and an upper bearing provided at the cover portion so as to be located adjacent to the seal member in the axial direction and rotatably supporting the motor rotor.

18. The power steering apparatus according to claim 15, wherein the motor housing includes an inner housing provided between the motor element and the steering housing in the axial direction, and fixed to an inner side of the motor housing, and
wherein the rotational sensor includes a sensor rotor configured to rotate together with the input shaft, and a sensor stator provided radially outside the sensor rotor and fixed to the inner housing.

19. The power steering apparatus according to claim 18, further comprising a sensor stator fixation bolt fixing the sensor stator to the inner housing, the sensor stator fixation bolt being provided so as to overlap the rotational sensor in the axial direction.

20. The power steering apparatus according to claim 19, wherein the inner housing includes a recessed portion opened to a side that faces the rotational sensor in the axial direction, and
wherein the rotational sensor is disposed so as to enter the recessed portion in the axial direction.

21. A power steering apparatus comprising:
a steering shaft including an input shaft configured to rotate according to an operation of steering a steering wheel, and an output shaft connected to the input shaft via a torsion bar;
a steering housing rotatably supporting the steering shaft;
a motor element configured to control rotation of the input shaft according to an operation status of a vehicle;
a motor housing containing the motor element therein; and
a rotational sensor configured to detect a rotational position of a motor rotor of the motor element,
wherein the rotational sensor is provided between the motor element and the steering housing in an axial direction of the input shaft, and
wherein the power steering apparatus further comprises a fixation member fixing the motor housing to the steering housing, the fixation member being provided so as to overlap the rotational sensor as viewed from the radial direction of the input shaft and being provided radially outside the rotational sensor.

* * * * *